United States Patent
Salsbury et al.

(10) Patent No.: US 10,914,480 B2
(45) Date of Patent: Feb. 9, 2021

(54) BUILDING CONTROL SYSTEM WITH DECOUPLER FOR INDEPENDENT CONTROL OF INTERACTING FEEDBACK LOOPS

(71) Applicant: Johnson Controls Technology Company, Auburn Hills, MI (US)

(72) Inventors: Timothy I. Salsbury, Mequon, WI (US); Carlos Felipe Alcala Perez, Milwaukee, WI (US); John M. House, Saint-Leonard (CA); Christopher R. Amundson, Grafton, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

(21) Appl. No.: 16/253,965

(22) Filed: Jan. 22, 2019

(65) Prior Publication Data

US 2019/0154289 A1    May 23, 2019

Related U.S. Application Data

(63) Continuation of application No. 15/625,605, filed on Jun. 16, 2017, now Pat. No. 10,253,997.

(51) Int. Cl.
*F24F 11/30* (2018.01)
*G05D 23/19* (2006.01)
(Continued)

(52) U.S. Cl.
CPC .............. *F24F 11/30* (2018.01); *F24F 11/62* (2018.01); *G05B 19/048* (2013.01);
(Continued)

(58) Field of Classification Search
None
See application file for complete search history.

(56) References Cited

U.S. PATENT DOCUMENTS

| 4,199,101 A | 4/1980 | Bramow et al. |
| 5,298,845 A | 3/1994 | Deboer et al. |

(Continued)

FOREIGN PATENT DOCUMENTS

EP    1 021 752 A1    7/2000

OTHER PUBLICATIONS

Extended European Search Report issued in European Patent Application No. 18177037.1 dated Oct. 30, 2018. 10 pages.
(Continued)

*Primary Examiner* — Bernard G Lindsay
(74) *Attorney, Agent, or Firm* — Foley & Lardner LLP

(57) ABSTRACT

Disclosed is a system to control a climate of a space via a first control loop and a second control loop interacting with the first control loop. The system includes a first controller of the first control loop to generate a first control signal based on a first modified set point and a first feedback signal. The system further includes a second controller of the second control loop to generate a second control signal based on a second modified set point and a second feedback signal. The system further includes a decoupler configured to predict a first effect of the first control signal on the second control loop and a second effect of the second control signal on the first control loop, and generate the first modified set point and the second modified set point to reduce the first effect and the second effect.

20 Claims, 13 Drawing Sheets

(51) Int. Cl.
*F24F 11/62* (2018.01)
*G05B 19/048* (2006.01)
*F24F 11/32* (2018.01)
*F24F 11/64* (2018.01)
*F24F 11/52* (2018.01)
*F24F 11/61* (2018.01)

(52) U.S. Cl.
CPC .......... *G05D 23/1932* (2013.01); *F24F 11/32* (2018.01); *F24F 11/52* (2018.01); *F24F 11/61* (2018.01); *F24F 11/64* (2018.01); *G05B 2219/2614* (2013.01)

(56) References Cited

U.S. PATENT DOCUMENTS

| | | | |
|---|---|---|---|
| 5,568,378 A | 10/1996 | Wojsznis | |
| 6,691,009 B1 * | 2/2004 | Yao | B62D 6/002 180/402 |
| 7,847,681 B2 | 12/2010 | Singhal et al. | |
| 10,253,997 B2 * | 4/2019 | Salsbury | G05B 19/048 |
| 2002/0107604 A1 * | 8/2002 | Riley | G05B 11/42 700/121 |
| 2003/0080798 A1 * | 5/2003 | Groe | G06G 7/186 327/344 |
| 2005/0279844 A1 | 12/2005 | Bagwell et al. | |
| 2008/0179409 A1 | 7/2008 | Seem | |
| 2008/0294291 A1 | 11/2008 | Salsbury | |
| 2013/0197676 A1 | 8/2013 | Salsbury et al. | |
| 2013/0211550 A1 * | 8/2013 | Lu | G05B 11/32 700/19 |
| 2016/0098022 A1 | 4/2016 | Wenzel et al. | |
| 2017/0030598 A1 | 2/2017 | Burns et al. | |

OTHER PUBLICATIONS

Jevtovic et al., Pid Controller Design of Tito System Based on Ideal Decoupler, Journal of Process Control, 20(7):869-876, 2010.
Lee et al., Static Decouplers for Control of Multivariable Processes, AlChE Journal, 51(10):2712-2720, 2005.
Notice of Allowance on U.S. Appl. No. 15/625,605 dated Nov. 15, 2018. 17 pages.
Pomerleau et al. Guide lines for the tuning and the evaluation of decentralized and decoupling controllers for processes with recirculation ISA Transactions 40 (2001) 341-351.
Seborg et al., Process Dynamics and Control, John Wiley & Sons, 2010.
Shen et al., Normalized Decoupling Control for High-Dimensional Mimo Processes for Application in Room Temperature Control HVAC Systems, Control Engineering Practice, 18(6):652-664, 2010.
Office action on EP App. No. 18177037.1 dated Jan. 15, 2020. 6 pages.

* cited by examiner

BUILDING CONTROL SYSTEM WITH DECOUPLER FOR INDEPENDENT CONTROL OF INTERACTING FEEDBACK LOOPS

CROSS REFERENCE TO RELATED PATENT APPLICATION

This application is a continuation of U.S. patent application Ser. No. 15/625,605, filed Jun. 16, 2017, which is incorporated by reference herein in its entirety for all purposes.

BACKGROUND

The present disclosure relates generally to control systems for a heating, venting, and air conditioning (HVAC) system. More particularly, the present disclosure relates to a decoupler for improving independent control of interacting feedback loops.

HVAC systems can be used to control the climate of a space (e.g., in a building). For example, HVAC systems may allow a temperature, pressure, humidity, or a combination of them in a room to be controlled. HVAC systems often include a feedback loop comprised of a water plant, a heater plant, or both for adjusting a temperature, and a sensor for sensing a temperature in a room. These components in the feedback loop operate together to set the climate within the room to be at a target climate.

Some HVAC systems include multiple feedback loops for controlling climates of different areas. For example, a first feedback loop may be responsible for controlling a climate in a first area, and a second feedback loop may be responsible for controlling a climate in a second area near the first area. The first feedback loop and the second feedback loop may be designed to be isolated from each other to allow independent controls of climates in two areas. However, an interaction between the first feedback loop and the second feedback loop may occur, thereby affecting controls of the climates in the two areas. For example, a wall separating the first area and the second area may be removed, which may cause interaction between the feedback loops. Such interaction between the feedback loops may obstruct accurate control of the climate in different areas.

SUMMARY

Various embodiments of the present disclosure relate to a system to control a climate of a space via a first control loop and a second control loop that interacts with the first control loop. The system includes a first controller of the first control loop. The first controller is configured to receive a first modified set point and a first feedback signal, and to generate a first control signal based on the first modified set point and the first feedback signal. The system further includes a second controller of the second control loop. The second controller is configured to receive a second modified set point and a second feedback signal, and to generate a second control signal based on the second modified set point and the second feedback signal. The system further includes a decoupler coupled to the first controller and the second controller. The decoupler is configured to receive a first set point, a second set point, the first feedback signal, and the second feedback signal. The decoupler is further configured to predict a first effect of the first control signal on the second control loop, and predict a second effect of the second control signal on the first control loop. The decoupler is further configured to generate the first modified set point and the second modified set point based on the first set point, the second set point, the first feedback signal, and the second feedback signal to reduce the first predicted effect and the second predicted effect.

Various embodiments of the present disclosure also relate to a method of controlling a climate of a space via a first control loop and a second control loop that interacts with the first control loop. The method includes receiving, by a decoupler, a first set point, a second set point, a first feedback signal, and a second feedback signal. The method further includes predicting a first effect of a first control signal on the second control loop. The method further includes predicting a second effect of a second control signal on the first control loop. The method further includes generating, by the decoupler, a first modified set point and a second modified set point based on the first set point, the second set point, the first feedback signal, and the second feedback signal to reduce the first predicted effect and the second predicted effect. The method further includes generating, by a first controller of the first control loop electrically coupled to the decoupler, the first control signal based on the first modified set point and the first feedback signal. The method further includes generating, by a second controller of the second control loop electrically coupled to the decoupler, the second control signal based on the second modified set point and the second feedback signal.

DETAILED DESCRIPTION

Overview

Referring generally to the FIGURES, systems and methods for improving independent controls of interacting feedback loops in an HVAC system are described. More particularly, the present disclosure relates to a decoupler for improving control of interacting feedback loops.

In some embodiments, a disclosed system herein includes a decoupler to improve independent control of interacting feedback loops for controlling climates of different areas. In one aspect, the decoupler receives target set points, and generates modified set points by modifying the target set points. Each target set point may be an electrical signal or data indicating a target climate (e.g., target temperature, pressure, or humidity) of a respective area. The decoupler predicts interactions between feedback loops, and performs modifications on the target set points based on the predictions. Each feedback loop may include a feedback loop controller for generating a control signal according to a target set point and a sensed climate (also referred to as "a measured climate"), and a climate actuator (e.g., heater, cooler, a valve, etc.) for changing climate in a respective area according to the control signal. The decoupler predicts an effect of a control signal for controlling a feedback loop on another feedback loop. Moreover, the decoupler modifies the target set points to generate the modified set points according to the predicted effect. The modified set points may improve independent control of climates in different rooms. For example, a first modified set point applied to a first feedback loop and a second modified set point applied to a second feedback loop allow climate of a first area to be controlled according to a first target set point regardless of a second target set point, and climate of a second area to be controlled according to the second target set point regardless of the first target set point.

Beneficially, the disclosed system provides several advantages. In one aspect, the system can dynamically adapt to a change in a configuration of a space. For example, when a wall separating two areas within a space is removed, the decoupler can predict a change in interactions between two feedback loops, and adaptively generate modified set points according to the predicted change. In another aspect, the disclosed system implements the decoupler at a front end before the feedback loops, allowing ease of integration with existing feedback loops or existing components of the feedback loops. Often, a feedback loop controller and a climate actuator in a feedback loop are implemented in a single package. By implementing the decoupler at the front end as disclosed herein, any modifications on a signal or an operation between the feedback loop controller and the climate actuator can be eschewed.

Building and HVAC System

Figure 1:
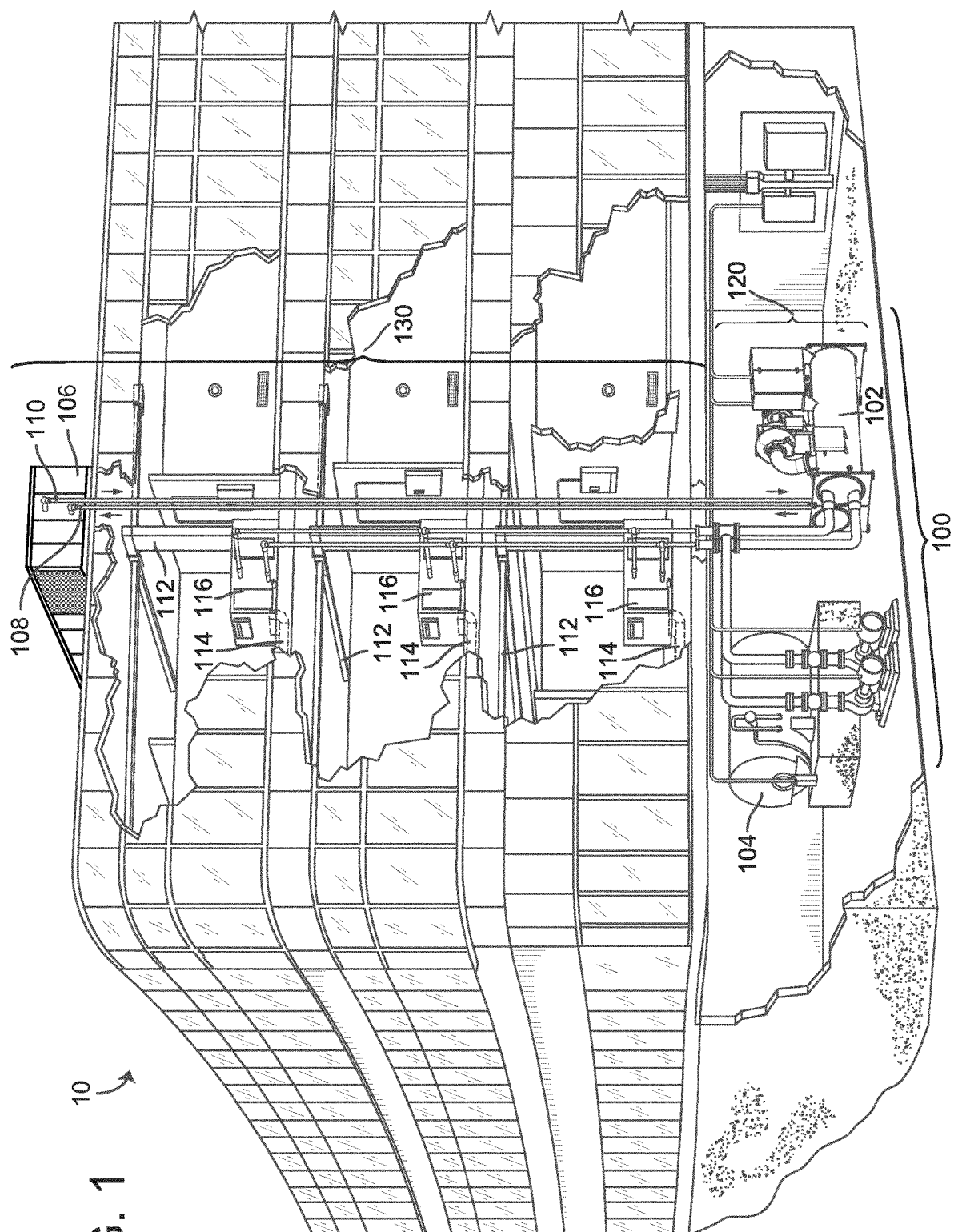
FIG. 1 is a drawing of a building equipped with an HVAC system, according to some embodiments.
Figure 2:
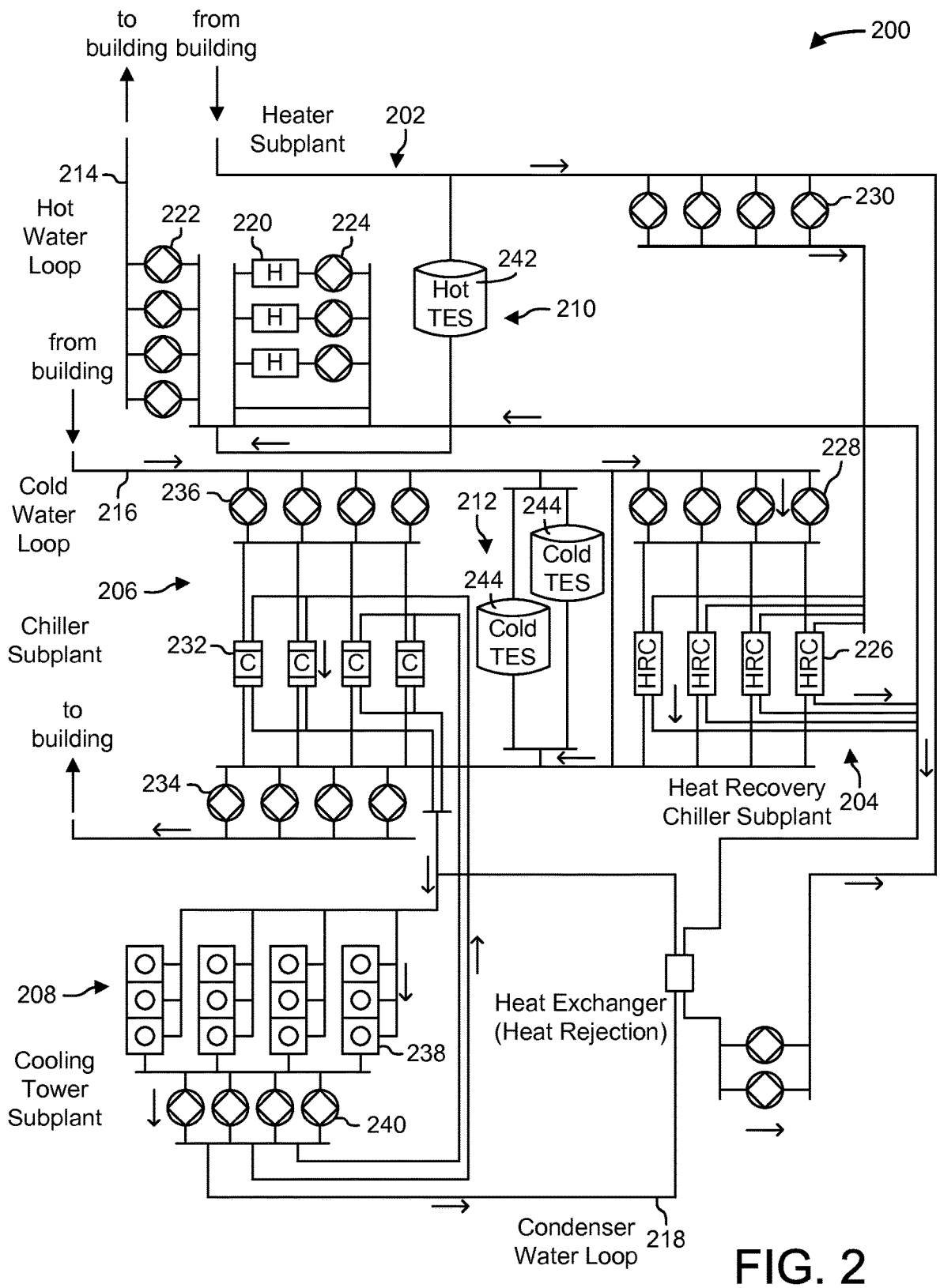
FIG. 2 is a schematic of a waterside system, which can be used as part of the HVAC system of FIG. 1, according to some embodiments.
Figure 3:
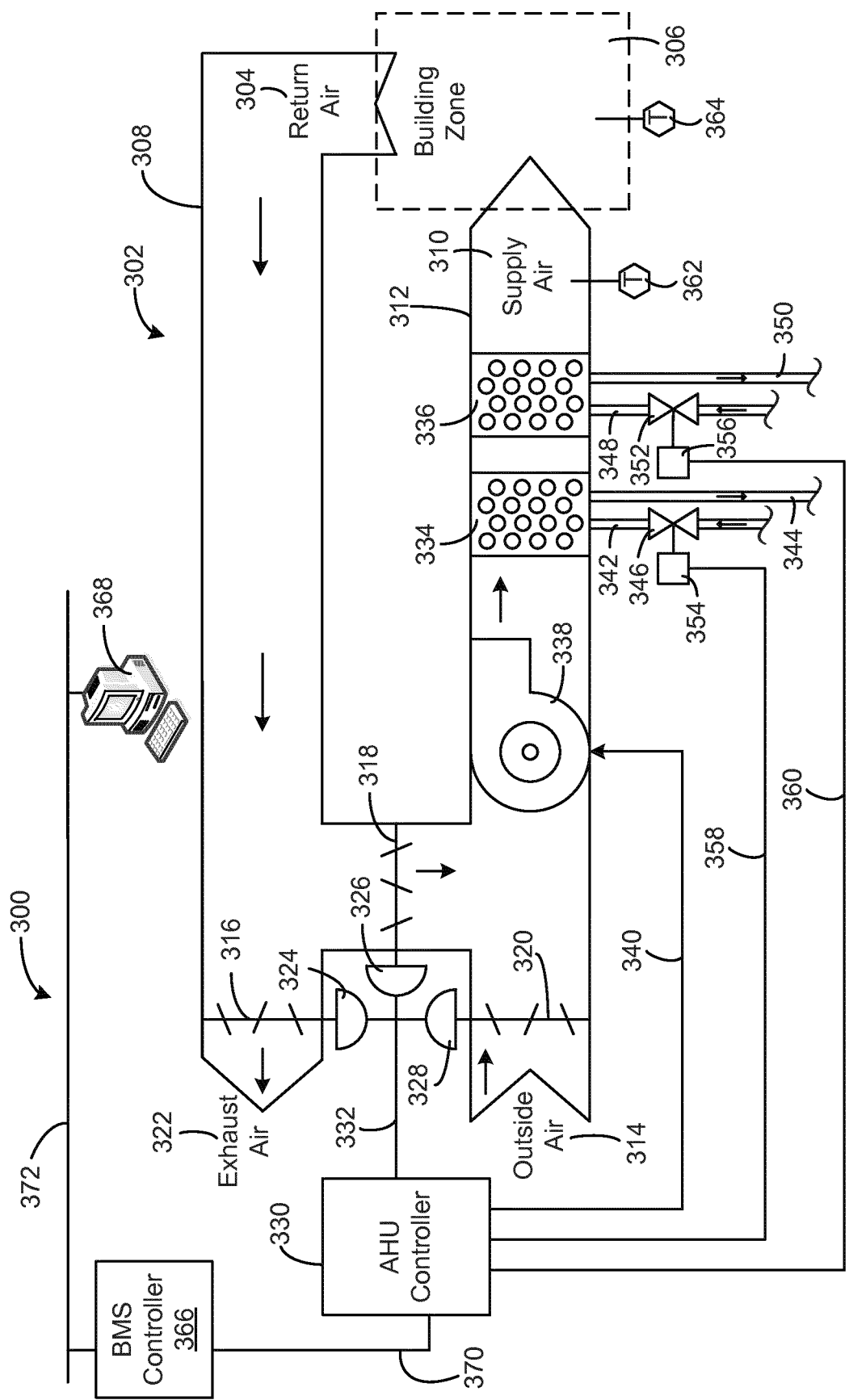
FIG. 3 is a block diagram illustrating an airside system, which can be used as part of the HVAC system of FIG. 1, according to some embodiments.

Referring now to FIGS. 1-3, an exemplary HVAC system in which the systems and methods of the present disclosure can be implemented are shown, according to an exemplary embodiment. While the systems and methods of the present disclosure are described primarily in the context of a building HVAC system, it should be understood that the control strategies described herein may be generally applicable to any type of control system.

Referring particularly to FIG. 1, a perspective view of a building 10 is shown. Building 10 is served by a building management system (BMS). A BMS is, in general, a system of devices configured to control, monitor, and manage equipment in or around a building or building area. A BMS can include, for example, an HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve set-point conditions for the building zone.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 and the building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment's configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive return air 304 and outside air 314. AHU 302 can be configured to operate an exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust air damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to AHU controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a set-point temperature for supply air 310 or to maintain the temperature of supply air 310 within a set-point temperature range). The positions of valves 346 and 352 affect the amount of heating or cooling provided to supply air 310 by heating coil 336 or cooling coil 334 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination thereof.

Still referring to FIG. 3, airside system 300 is shown to include a BMS controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. The AHU controller 330 may be a hardware module, a software module configured for execution by a processor of BMS controller 366, or both.

In some embodiments, AHU controller 330 receives information (e.g., commands, set points, operating boundaries, etc.) from BMS controller 366 and provides information (e.g., temperature measurements, valve or actuator positions, operating statuses, diagnostics, etc.) to BMS controller 366. For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Example Climate Control System

Figure 4A:
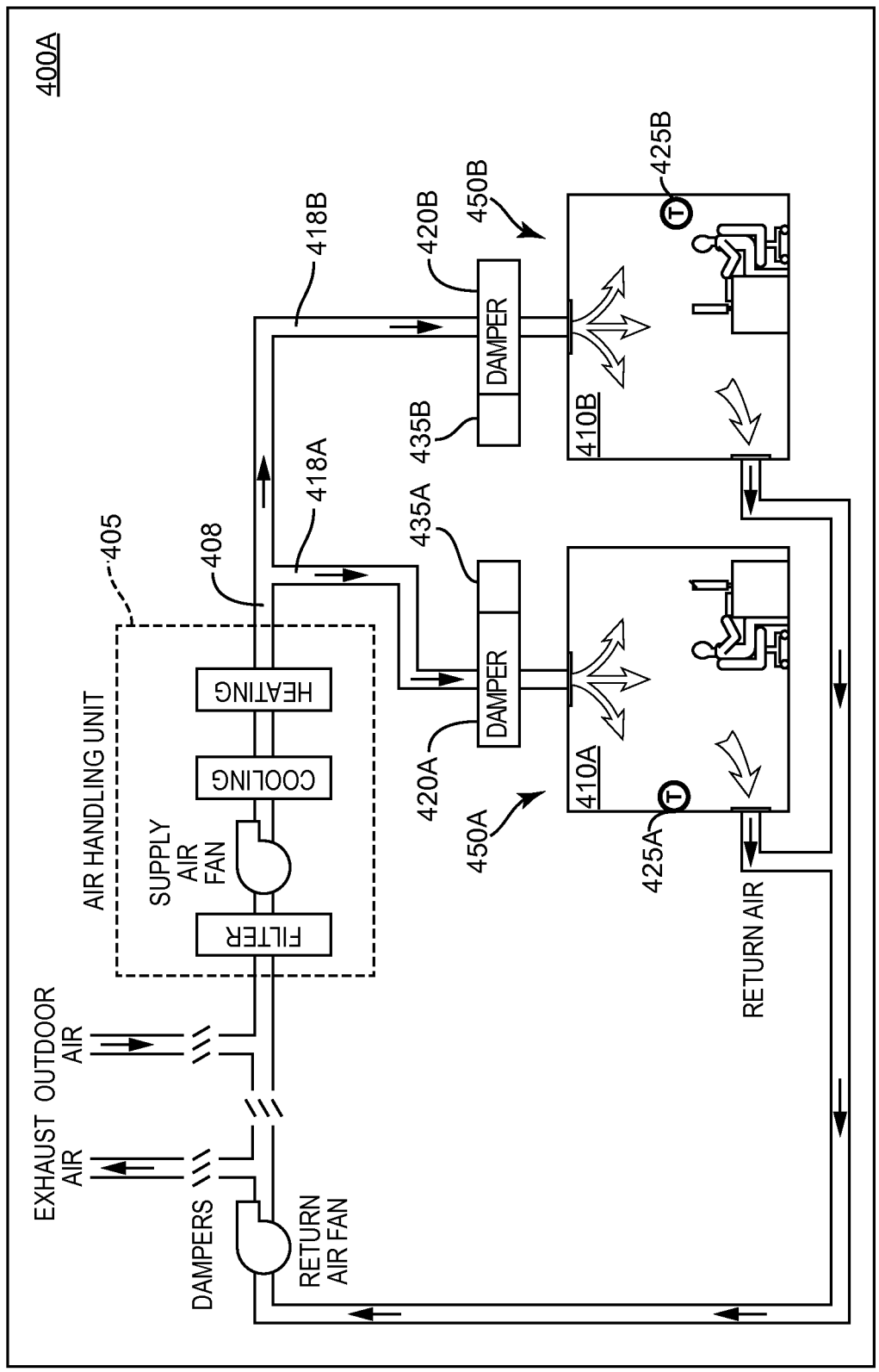
FIG. 4A is a drawing of an HVAC system controlling climates of two rooms with two feedback loops, according to some embodiments.

Referring to FIG. 4A, a drawing of an HVAC system 400A controlling climates of two rooms 410A, 410B with independent feedback loops 450A, 450B is shown, according to some embodiments. The HVAC system 400A may be the HVAC system 100 of FIG. 1. In FIG. 4A, the HVAC system 400A includes an air handling unit 405, dampers 420A, 420B (e.g., valves), thermostats 425A, 425B, and the feedback loop controllers 435A, 435B. The air handling unit 405 supplies air to the rooms 410A, 410B through a common duct 408 and separate ducts 418A, 418B coupled to the common duct 408. Air supplied to the room 410A is controlled by the first feedback loop 450A including the damper 420A, the thermostat 425A and the feedback loop controller 435A to adjust climate of the room 410A. Similarly, air supplied to the room 410B is controlled by the second feedback loop 450B including the damper 420B, the thermostat 425B and the feedback loop controller 435B to adjust climate of the room 410B.

A thermostat 425 is a device to provide a target set point and a feedback signal for a corresponding room 410. A target set point is a signal or data indicating a target climate (e.g., target temperature, target pressure, target humidity, etc.) of its associated area. The feedback signal may be an electrical signal or data indicating a sensed climate (e.g., measured temperature, measured pressure, measured humidity, etc.) of its associated area. The thermostat 425 provides the target set point and the feedback signal to the feedback loop controller 435 through a wired or wireless communication link. The thermostat 425 may include a switch, push buttons, or touch sensor integrated display allowing a user to select a target climate. The thermostat 425 generates a target set point indicating the selected target climate, and provides the target set point to the feedback loop controller 435. In addition, the thermostat 425 may include one or more climate sensors (e.g., a temperature sensor, pressure sensor, humidity sensor, etc.) that sense climate of an area of a room, and generate a feedback signal based on the sensed climate. The thermostat 425 also provides the feedback signal to the feedback loop controller 435.

The feedback loop controller 435 is a component that receives target set points and feedback signals from the thermostats 425, and controls a climate of a corresponding room 410 accordingly. The feedback loop controller 435 may be hardware, software, firmware, or a combination thereof. Examples of feedback loop controller 435 include a proportional-integral-derivative (PID) controller and a proportional-integral (PI) controller. In one implementation, the feedback loop controller 435 is communicatively coupled to the thermostat 425 through wired or wireless communication links. The feedback loop controller 435 may be integrated with the damper 420 in a single package. Alternatively, the feedback loop controller 435 and the damper 420 may be physically separated and electrically coupled to each other through conductive wires or traces. In this configuration, the feedback loop controller 435 receives a target set point and a feedback signal of the room 410 from the thermostat 425, and generates a control signal for controlling an amount of opening (or closing) of the damper 420 based on the target set point and the feedback signal of the room 410.

Figure 4B:
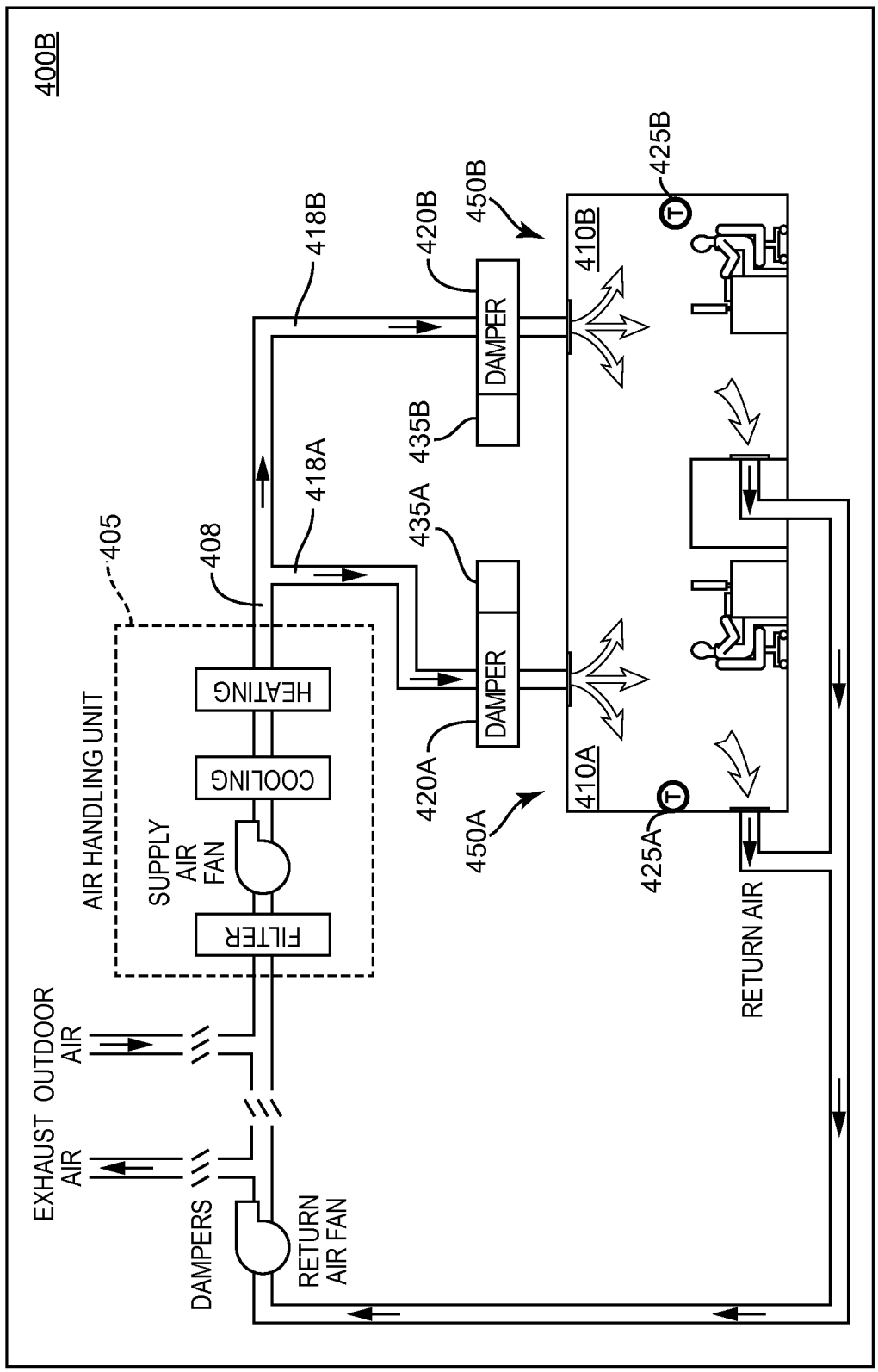
FIG. 4B is a drawing of two feedback loops interacting with each other due to a change in a configuration of the two rooms of FIG. 4A, according to some embodiments.

FIG. 4B is a drawing of two feedback loops 450A, 450B interacting with each other due to a change in a configuration of the two rooms 410A, 410B of FIG. 4A. A configuration of two rooms 410A, 410B may be temporarily or permanently changed by modifying a wall, a ceiling, a removable partition, or ductwork connected to the two rooms 410A, 410B. In the example shown in FIG. 4B, air can be exchanged through a space, at which the wall separating the rooms 410A, 410B in FIG. 4A was located. The exchanged air can affect climates of the rooms 410A, 410B, thereby causing an interaction between the two feedback loops 450A, 450B. Such interaction between the two feedback loops 450A, 450B may degrade an ability to independently control climates of the rooms 410A, 410B.

Figure 5A:
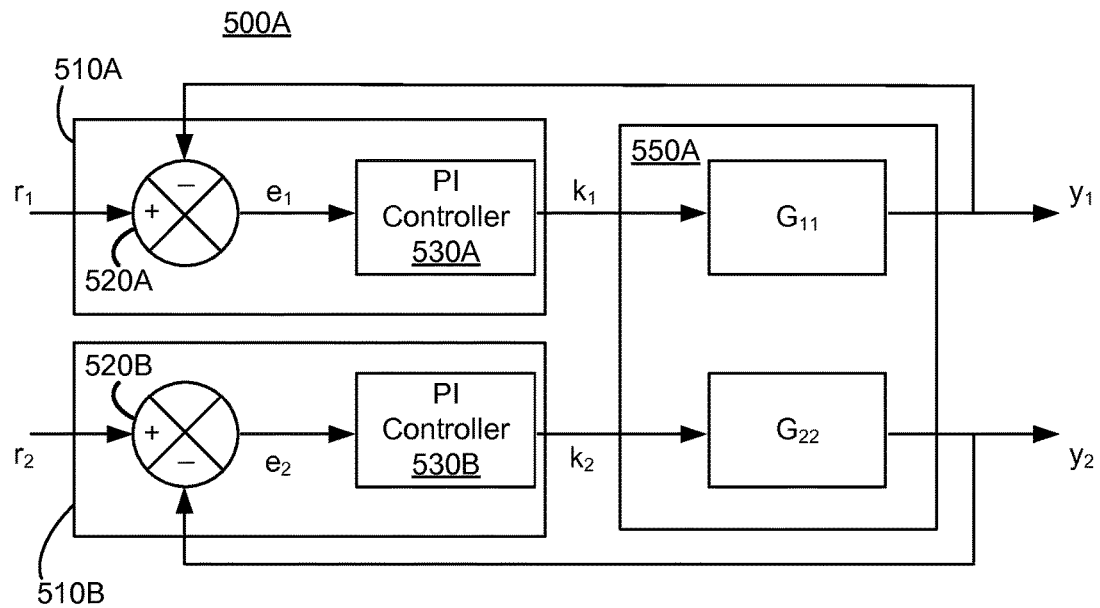
FIG. 5A is a block diagram of a climate control system including two independent feedback loops of FIG. 4A, according to some embodiments.

FIG. 5A shows a schematic representation of a climate control system 500A including two independent feedback loops. The climate control system 500A may be part of the HVAC system 400A of FIG. 4A. The climate control system 500A includes a first feedback loop controller 510A, a second feedback loop controller 510B, and an actuator multiplier network 550A comprising a first primary actuator multiplier $G_{11}$ and a second primary actuator multiplier $G_{22}$. In one configuration, a first feedback loop controller 510A and the first primary actuator multiplier $G_{11}$, form a first feedback loop. Similarly, a second feedback loop controller 510B and the second primary actuator multiplier $G_{22}$ form a second feedback loop. The first feedback loop receives a first target set point $r_1$, and changes a first feedback signal $y_1$ according to the first target set point $r_1$. Similarly, the second feedback loop receives a second target set point $r_2$, and changes a second feedback signal $y_2$ according to the second target set point $r_2$. The first feedback signal $y_1$ may be an electrical signal or data indicating a sensed climate (e.g., measured temperature, measured pressure, or measured humidity) of a first area of the room 410A, and the second feedback signal $y_2$ may be an electrical signal or data indicating a sensed climate of a second area of the room 410B. As shown in FIG. 5A, the first feedback loop and the second feedback loop are independent from each other.

The first feedback loop controller 510A receives the first target set point $r_1$ and the first feedback signal $y_1$, and generates a first control signal $k_1$ according to the first target set point $r_1$ and the first feedback signal $y_1$. The first feedback loop controller 510A may be part of the feedback loop controller 435A of FIG. 4A. The first feedback loop controller 510A may include a first control error detector 520A, and a first proportional-integral (PI) controller 530A coupled to the first control error detector 520A.

The first control error detector 520A receives the first target set point $r_1$ and the first feedback signal $y_1$, and generates a first control error signal $e_1$ based on the first target set point $r_1$ and the first feedback signal $y_1$. In one aspect, the first control error detector 520A obtains a difference between the first target set point $r_1$ and the first feedback signal $y_1$, and generates the first control error signal $e_1$ indicating the difference. The first control error detector 520A outputs the first control error signal $e_1$ to the first PI controller 530A.

The first PI controller 530A receives the first control error signal $e_1$ and generates the first control signal $k_1$ based on the first control error signal $e_1$. The first PI controller 530A includes an input coupled to an output of the first control error detector 520A. In this configuration, the first PI controller 530A may generate the first control signal $k_1$ based on present and previous components of the first control error signal $e_1$. The first PI controller 530A outputs the first control signal $k_1$ to the first primary actuator multiplier $G_{11}$.

The first primary actuator multiplier $G_{11}$ represents an effect on the climate of a respective area in response to the first control signal $k_1$. The first primary actuator multiplier $G_{11}$ may correspond to a combination of a climate actuator (e.g., damper 420 of FIG. 4A) changing climate according to a control signal and a thermostat sensing the climate and generating a feedback signal according to the sensed climate. For example, the first primary actuator multiplier $G_{11}$ represents an effect of a temperature in the room 410A of FIG. 4A according to the damper 420A operated based on the first control signal $k_1$. In one aspect, the primary actuator multiplier $G_{11}$ represents that the first feedback signal $y_1$ is obtained by multiplying the first control signal $k_1$ by a first primary actuator coefficient $gc_{11}$. The first primary actuator coefficient $gc_{11}$ may be obtained through an open loop test measurement.

The second feedback loop receives the second target set point $r_2$ and the second feedback signal $y_2$, and changes the second feedback signal $y_2$ according to the second target set point $r_2$ and the second feedback signal $y_2$. The second feedback loop includes the second feedback loop controller 510B, and the second primary actuator multiplier $G_{22}$, that are configured and operate in a similar manner as the first feedback loop controller 510A and the first primary actuator multiplier $G_{11}$ of the first feedback loop. Therefore, the detailed description thereof is omitted herein for the sake of brevity.

Figure 5B:
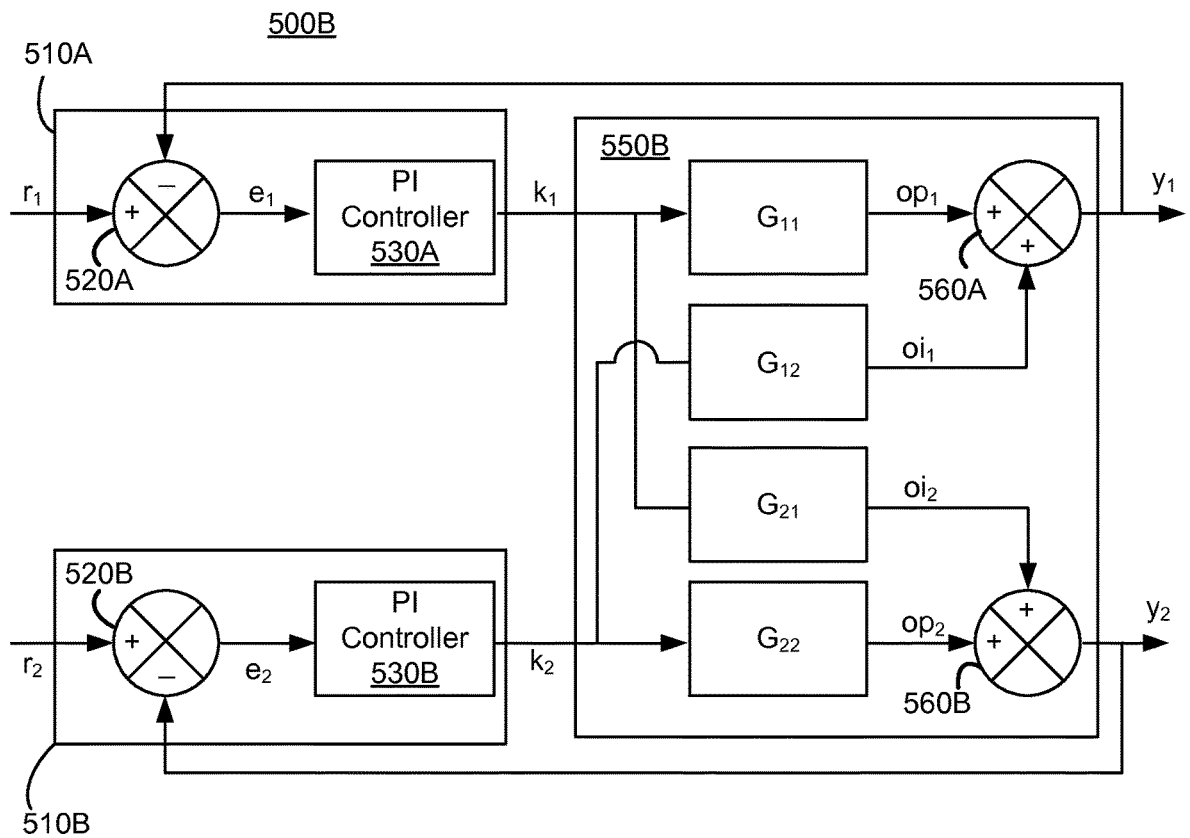
FIG. 5B is a block diagram of a climate control system including two interacting feedback loops of FIG. 4B, according to some embodiments.

FIG. 5B shows a schematic representation of a climate control system 500B including two interacting feedback loops. The climate control system 500B may be part of the HVAC system 400B of FIG. 4B. The components of the climate control system 500B are substantially similar to the components of the climate control system 500A in FIG. 5A, except the actuator multiplier network 550B further includes interaction actuator multipliers $G_{12}$ and $G_{21}$ and adders 560A, 560B, and outputs of the primary actuator multipliers $G_{11}$ and $G_{22}$ are replaced with primary actuator output signals $op_1$, $op_2$, respectively. In one aspect, the interaction actuator multipliers $G_{12}$ and $G_{21}$ and adders 560A, 560B may not be physically implemented, but models effects of climates due to interaction between two feedback loops. The interaction between the feedback loops may occur in response to a change in a configuration of two rooms 410A, 410B, as shown in FIG. 4B. Such interactions as represented by these additional components may degrade control performance of the feedback loops.

The interaction actuator multiplier $G_{12}$ and the adder 560A represent an effect of the second control signal $k_2$ on the first feedback loop, and the interaction actuator multiplier $G_{21}$ and the adder 560B represent an effect of the first control signal $k_1$ on the second feedback loop. For example, the interaction actuator multiplier $G_{12}$ represents an effect on the temperature in the room 410A by controlling the damper 420B according to the second control signal $k_2$. Similarly, the interaction actuator multiplier $G_{21}$ represents an effect on the temperature in the room 410B by controlling the damper 420A according to the first control signal $k_1$. In one approach, the interaction actuator multiplier $G_{21}$ represents that the interaction actuator output signal $oi_2$ may be obtained by multiplying the first control signal $k_1$ by an interaction actuator coefficient $gc_{21}$. Similarly, the interaction actuator multiplier $G_{12}$ represents that the interaction actuator output signal $oi_1$ may be obtained by multiplying the second control signal $k_2$ by an interaction actuator coefficient $gc_{12}$. The adder 560A represents that the feedback signal $y_1$ is affected by the interaction actuator output signal $oi_1$ from the interaction actuator multiplier $G_{12}$. Similarly, the adder 560B represents that the feedback signal $y_2$ is affected by the interaction actuator output signal $oi_2$ from the interaction actuator multiplier $G_{21}$. Hence, the interaction actuator multipliers $G_{12}$ and $G_{21}$ and adders 560A, 560B model interference between two feedback loops.

Figure 6:
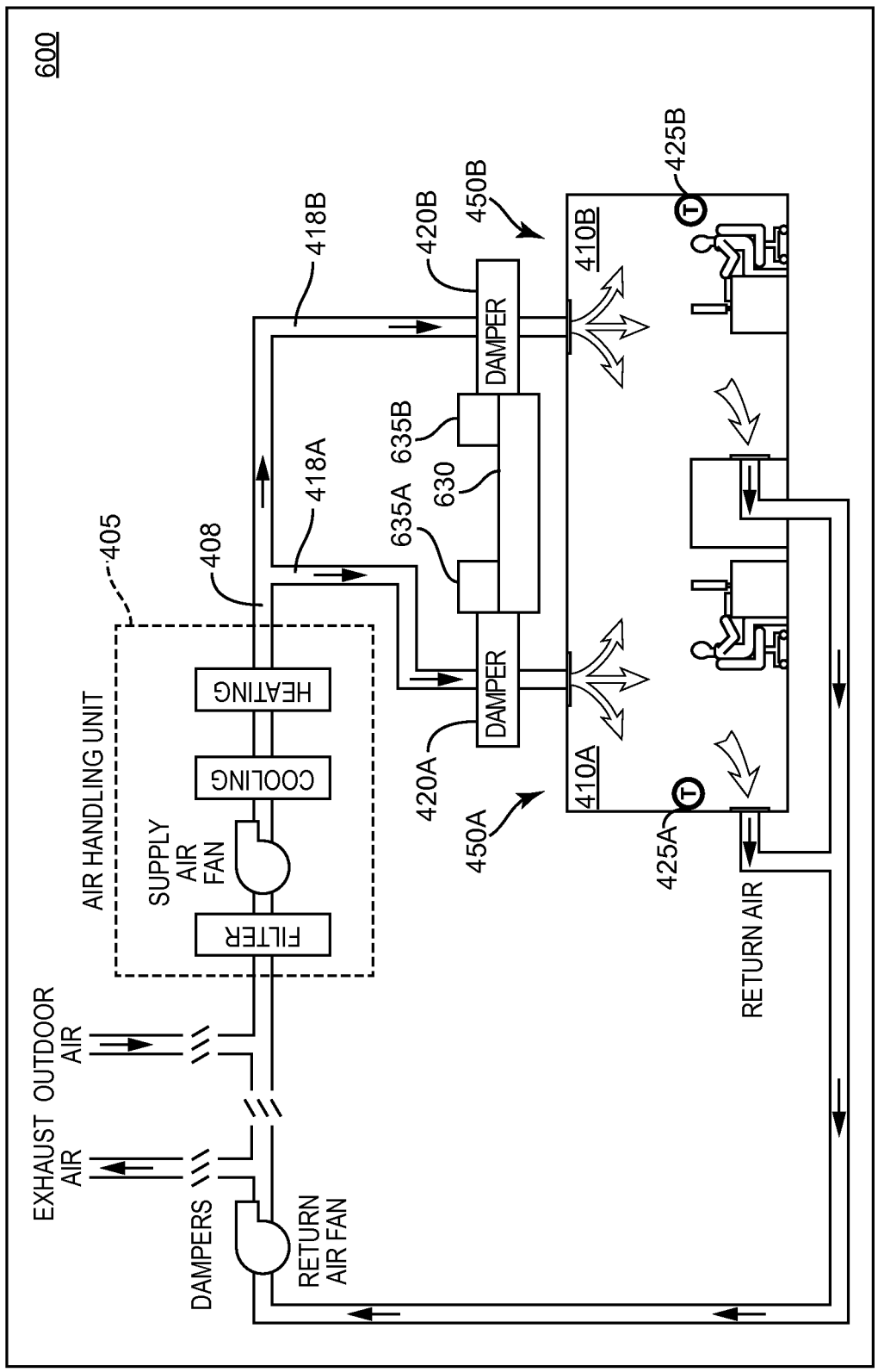
FIG. 6 is a drawing of an HVAC system including a decoupler to improve independent control of climates of two rooms, according to some embodiments.

Referring to FIG. 6, illustrated is a drawing of an HVAC system 600 including a decoupler 630 to improve independent control of climates of two rooms, according to one or more embodiments. The configuration of the HVAC system 600 is similar to the HVAC system 400B of FIG. 4B, except that a decoupler 630 is added to improve control of interacting feedback loops 450A, 450B and the feedback loop controllers 435A, 435B of FIG. 4B are replaced with the feedback loop controllers 635A, 635B. Specifically, the decoupler 630 allows climates of the rooms 410A, 410B to be independently controlled despite of interaction between the rooms 410A, 410B. In some embodiments, different feedback loops or different components than shown in FIG. 6 may be included in the HVAC system 600. Moreover, additional rooms and additional feedback loops may be included in the HVAC system 600.

In one or more embodiments, the decoupler 630 is a component that receives target set points and feedback signals, and generates modified set points. The decoupler 630 may be hardware, software, firmware, or any combination thereof. In one implementation, the decoupler 630 is coupled between thermostats 425A, 425B, and feedback loop controllers 635A, 635B. In this configuration, the decoupler 630 receives target set points and feedback signals from the thermostats 425A, 425B, modifies the target set points to obtain modified set points, and provides the modified set points to the feedback loop controllers 635A, 635B. The modified set points provided to the feedback loop controllers 635A, 635B instead of target set points allow climates of the rooms 410A, 410B to be independently controlled. In some embodiments, the decoupler 630 and the feedback loop controllers 635A, 635B may be integrated together. Detailed configurations and operations of the decoupler 630 are provided below with respect to FIGS. 7 through 11.

Figure 7:
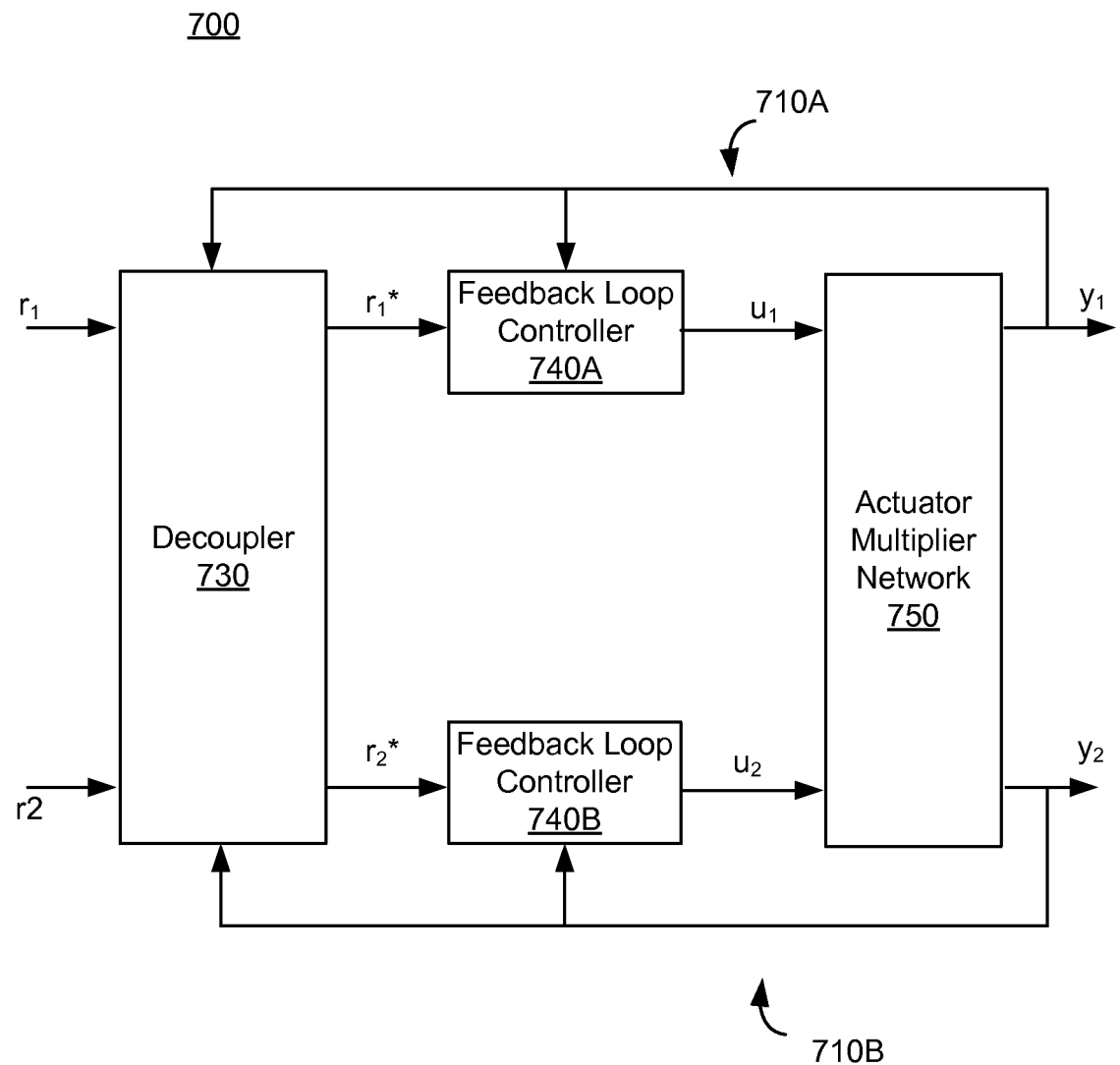
FIG. 7 is a block diagram of a climate control system including a decoupler, according to some embodiments.

FIG. 7 shows a schematic diagram of a climate control system 700 including a decoupler 730, according to some embodiments. The climate control system 700 may be part of the HVAC system 600 of FIG. 6. In FIG. 7, the climate control system 700 includes a decoupler 730, feedback loop controllers 740A, 740B, and an actuator multiplier network 750. The actuator multiplier network 750 may be same as the actuator multiplier network 550 of FIG. 5B, thus interaction between two feedback loops may occur through a cross-over network of the actuator multiplier network 750. In one aspect, the configuration of the climate control system 700 is similar to the climate control system 500B of FIG. 5B, except that the decoupler 730 is added and the feedback loop controllers 510A, 510B of FIG. 5B are replaced with feedback loop controllers 740A, 740B. In this configuration, the decoupler 730 receives target set point $r_1$, $r_2$ and feedback signals $y_1$, $y_2$, and generates modified set points $r_1^*$, $r_2^*$. The feedback loop controllers 740A, 740B generate control signals $u_1$, $u_2$ according to the modified set points $r_1^*$, $r_2^*$. The modified set points $r_1^*$, $r_2^*$ may cause each of the feedback signals $y_1$, $y_2$ from the actuator multiplier network 750 to depend on the target set points $r_1$, $r_2$, respectively, but not on the other target set points. Accordingly, the climate control system 700 improves control of climates in different areas despite of interacting feedback loops 710A, 710B.

In one or more embodiments, the decoupler 730 receives the target set points $r_1$, $r_2$ and the feedback signal $y_1$, $y_2$, and generates the modified set points $r_1^*$, $r_2^*$ based on the target set points $r_1$, $r_2$ and the feedback signal $y_1$, $y_2$. In one aspect, the decoupler 730 includes a cross-over network that predicts interaction between two feedback loops 710A, 710B and modifies the target set points $r_1$, $r_2$ to add pre-compensation components to the target set points $r_1$, $r_2$, according to the predicted interaction. The pre-compensation components applied to the actuator multiplier network 750 through the feedback loop controllers 740A, 740B allow the actuator multiplier network 750 to operate as if the interaction between the two feedback loops 710A, 710B does not occur. As a result, the decoupler 730 enables the feedback signal $y_1$ to be independent from the target set point $r_2$, and the feedback signal $y_2$ to be independent from the target set point $r_1$. Detailed description of implementation of the decoupler 730 is provided below with respect to FIGS. 8 and 9.

Although only two feedback loops are shown in FIGS. 6-7, the systems and methods described herein may be applicable to any number of interacting control loops. For example, the HVAC system 600 may include two interacting control loops, three interacting control loops, four interacting control loops, or more. In general, the HVAC system 600 may include N interacting control loops, where N≥2.

An example of a control system 700 for a space with two interacting control loops is described in detail with reference to FIGS. 7-11 to illustrate one implementation of the present invention. In various embodiments, the control system 700 can be used to decouple any number N of interacting control loops or may be implemented as part of a system including more than two interacting control loops in any configuration.

Each of the control loops may include a separate controller corresponding to one of the multiple control loops. Each controller can be configured to receive a modified set point from a corresponding decoupler and a feedback signal from one of the control loops. Each controller can generate a control signal for the corresponding control loop based on the modified set point and the feedback signal for the corresponding control loop.

The decoupler can be coupled to each of the two or more controllers. The decoupler may receive target set points and feedback signals from two or more interacting control loops. The decoupler may predict an effect of each control signal for the corresponding control loop on each of the two or more interacting control loops other than the corresponding control loop, and may generate each of the modified set points based on each of the target set points and each of the feedback signals to reduce the predicted effects of each control signal on each of the other control loops.

Figure 8:
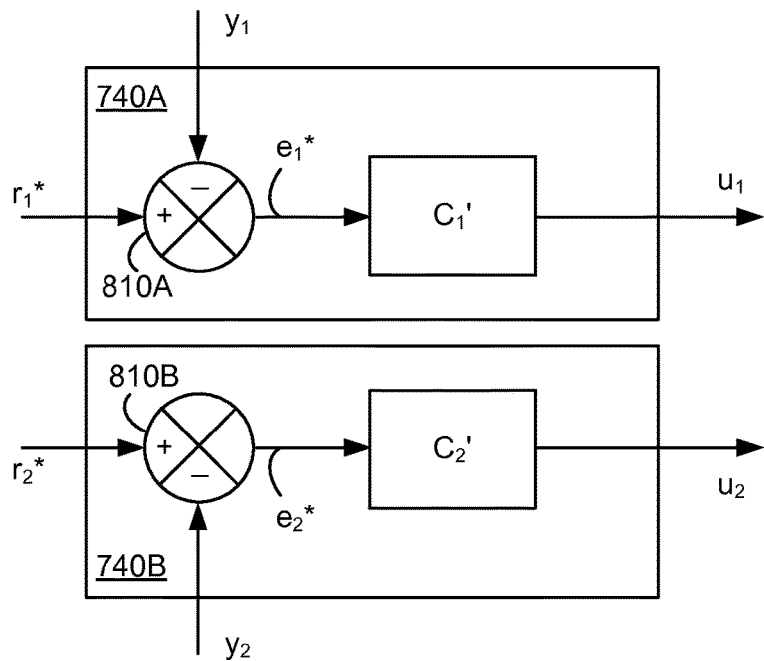
FIG. 8 is a block diagram of feedback loop controllers of FIG. 7, according to some embodiments.

FIG. 8 shows an example schematic diagram of feedback loop controllers 740A, 740B of FIG. 7, according to some embodiments. The feedback loop controllers 740A, 740B may be the feedback loop controllers 635A, 635B of FIG. 6. In one embodiment, the feedback loop controller 740A includes a control error detector 810A and a proportional-derivative (PD) controller $C_1'$. Similarly, the feedback loop controller 740B includes a control error detector 810B and a PD controller $C_2'$. The components in the feedback loop controllers 740A, 740B are substantially similar to the feedback loop controllers 510A, 510B of FIG. 5A, except that the control error detectors 810A, 810B receive modified set points $r_1^*$, $r_2^*$, respectively, and the PI controllers 530A, 530B are replaced with PD controllers $C_1'$, $C_2'$. Together, these components operate to control feedback loops.

Implementing the PD controllers $C_1'$, $C_2'$ instead of PI controllers allows the decoupler 730 to be implemented at the front end without intercepting control signals between the feedback loop controllers 740A, 740B, and the actuator multiplier network 750. Specifically, implementing a decoupler before a PI controller renders a static gain to be infinite. For example, a transfer function of a PI controller includes an integrator 1/s term as shown below:

$$C(s) = K\left(1 + \frac{1}{T_i s}\right) \qquad \text{Eq. (1)}$$

where C(s) is a transfer function of a PI controller, K is a proportional coefficient, and $T_i$ is an integral coefficient. In one aspect, the PI controller 530 can be converted into a PD controller as shown below:

$$C(s) = \frac{1}{s} * \frac{K}{T_i}(1 + T_i s) = \frac{1}{s} * C'(s), \; C'(s) = \frac{K}{T_i}(1 + T_i s) \qquad \text{Eq. (2)}$$

where C'(s) is a transfer function of a PD controller. An integrator 1/s can be implemented at a front end of the decoupler 730, thereby obviating the static gain from being infinite even though the decoupler 730 is implemented before the feedback loop controllers.

Figure 9:
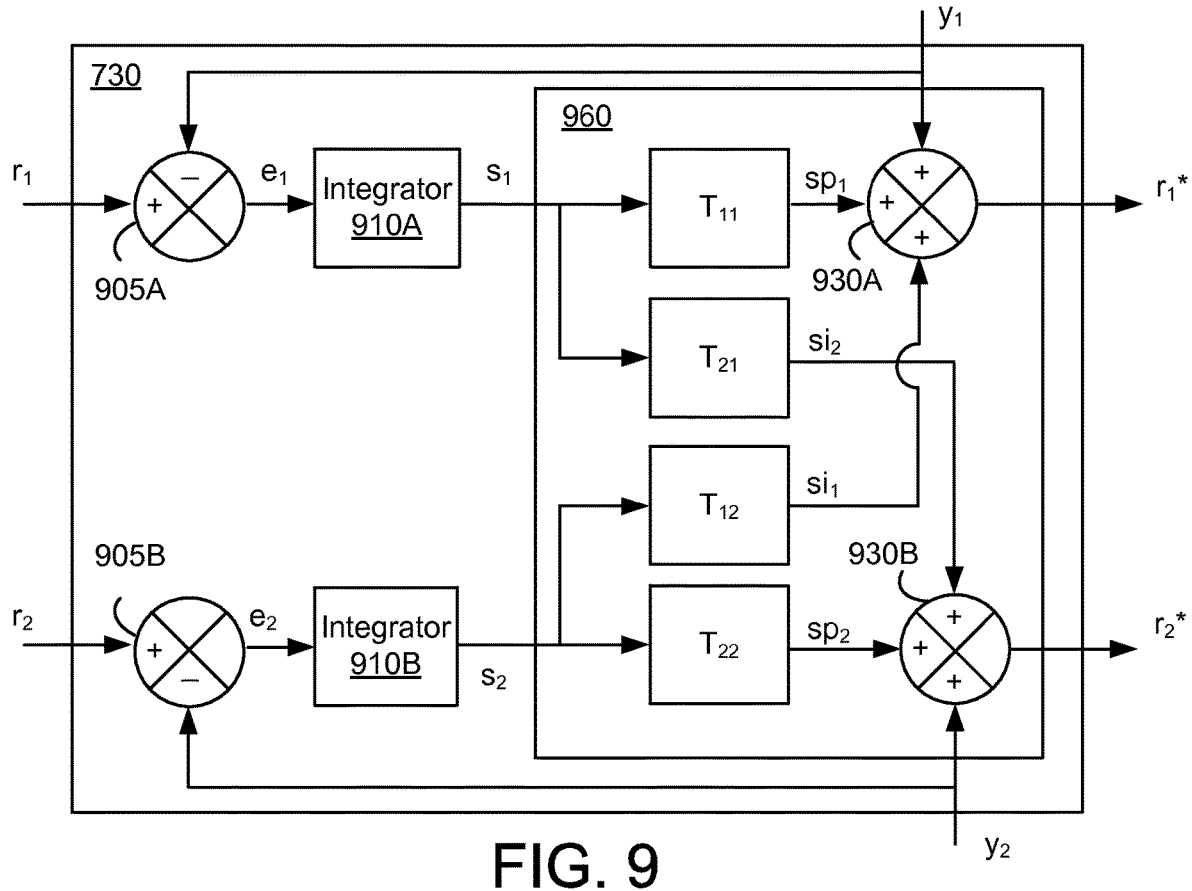
FIG. 9 is a block diagram of the decoupler of FIG. 7, according to some embodiments.

Referring to FIG. 9, illustrated is an example schematic diagram of the decoupler 730 of FIG. 7, according to some embodiments. In one embodiment, the decoupler 730 includes decoupling error detectors 905A, 905B, integrators 910A, 910B, and a cross-over network 960 including a primary decoupling multipliers $T_{11}$, $T_{22}$, interaction decoupler multipliers $T_{12}$, $T_{21}$, and decoupling adders 930A, 930B. The first decoupling error detector 905A receives a target set point $r_1$ and a feedback signal $y_1$, and generates an error signal $e_1$. Similarly, the second decoupling error detector 905B receives a target set point $r_2$ and a feedback signal $y_2$, and generates an error signal $e_2$. The integrator 910A receives the error signal $e_1$, and generates a first integrated decoupling error signal $s_1$. Similarly, the second integrator 910B receives the error signal $e_2$, and generates a second integrated decoupling error signal $s_2$. The cross-over network 960 receives the integrated decoupling error signals $s_1$, $s_2$ and the feedback signals $y_1$, $y_2$, and generates modified set points $r_1^*$, $r_2^*$. Together, these components operate to predict interaction between two feedback loops, and add pre-compensation components to the target set points $r_1$, $r_2$ to obtain the modified set points $r_1^*$, $r_2^*$.

The first decoupling error detector 905A receives the first target set point $r_1$ and the first feedback signal $y_1$, and generates a first decoupling error signal $e_1$ based on the first target set point $r_1$ and the first feedback signal $y_1$. In one aspect, the first decoupling error detector 905A obtains a difference between the first target set point $r_1$ and the first feedback signal $y_1$, and generates the first decoupling error signal $e_1$ indicating the difference. The first decoupling error detector 905A outputs the first decoupling error signal $e_1$ to the first integrator 910A.

The first integrator 910A receives the first decoupling error signal $e_1$ and generates the first integrated decoupling error signal $s_1$. The first integrator 910A includes an input coupled to an output of the first decoupling error detector 905A and an output coupled to an input of the cross-over network 960. In this configuration, the first integrator 910A integrates the first decoupling error signal $e_1$ for a time period to generate the first integrated decoupling error signal $s_1$, and provides the first integrated decoupling error signal $s_1$ to the cross-over network 960. In one aspect, the first integrator 910A is implemented as the integrator 1/s term from Eq. (2).

The second decoupling error detector 905B receives the second target set point $r_2$ and the second feedback signal $y_2$, and generates a second decoupling error signal $e_2$ based on the second target set point $r_2$ and the second feedback signal $y_2$. In one aspect, the second decoupling error detector 905B obtains a difference between the second target set point $r_2$ and the second feedback signal $y_2$, and generates the second decoupling error signal $e_2$ indicating the difference. The second decoupling error detector 905B outputs the second decoupling error signal $e_2$ to the second integrator 910B.

The second integrator 910B receives the second decoupling error signal $e_2$ and generates the second integrated decoupling error signal $s_2$. The second integrator 910B includes an input coupled to an output of the second decoupling error detector 905B and an output coupled to another input of the cross-over network 960. In this configuration, the second integrator 910B integrates the second decoupling error signal $e_2$ for a time period to generate a second integrated decoupling error signal $s_2$, and provides the second integrated decoupling error signal $s_2$ to the cross-over network 960. In one aspect, the second integrator 910B is implemented as the integrator 1/s term from Eq. (2).

The cross-over network 960 is a component that receives integrated decoupling error signals $s_1$, $s_2$ and feedback signals $y_1$, $y_2$ to generate modified set points $r_1^*$, $r_2^*$. In one implementation, the cross-over network 960 includes the primary decoupling multipliers $T_{11}$, $T_{22}$, the interaction decoupling multipliers $T_{12}$, $T_{21}$, and the decoupling adders 930A, 930B. In one configuration, the primary decoupling multiplier $T_{11}$ is coupled between the integrator 910A and the decoupling adder 930A, the primary decoupling multiplier $T_{22}$ is coupled between the integrator 910B and the decoupling adder 930B, the interaction decoupling multiplier $T_{12}$ is coupled between the integrator 910B and the decoupling adder 930A, and the interaction decoupling multiplier $T_{21}$ is coupled between the integrator 910A and the decoupling adder 930B. The decoupling adder 930A adds the feedback signal $y_1$ and outputs from the primary decoupling multiplier $T_{11}$ and the interaction decoupling multiplier $T_{12}$ to generate the modified set point $r_1^*$. Similarly, the decoupling adder 930B adds the feedback signal $y_2$ and outputs from the primary decoupling multiplier $T_{22}$ and the interaction decoupling multiplier Tel to generate the modified set point $r_2^*$.

In one embodiment, each of the decoupling multipliers $T_{11}$, $T_{12}$, $T_{21}$, $T_{22}$ multiplies its input with a corresponding coefficient. Specifically, the primary decoupling multiplier $T_{11}$ multiplies the integrated decoupling error signal $s_1$ by a first primary decoupling coefficient $tc_{11}$ to generate a first primary multiplied error signal $sp_1$ as an output. The interaction decoupling multiplier $T_{12}$ multiplies the integrated decoupling error signal $s_2$ by a first interaction decoupling coefficient $tc_{12}$ to generate a first interaction multiplied error signal $si_1$ as an output. Similarly, the primary decoupling multiplier $T_{22}$ multiplies the integrated decoupling error signal $s_2$ by a second primary decoupling coefficient $tc_{22}$ to generate a second primary multiplied error signal $sp_2$ as an output. The interaction decoupling multiplier Tel multiplies the integrated decoupling error signal $s_1$ by a second interaction decoupling coefficient tell to generate a second interaction multiplied error signal sit as an output.

The decoupling adders 930A, 930B are components that add multiplied error signals $sp_1$ $si_1$, $si_2$, $sp_2$ to feedback signals $y_1$, $y_2$ to obtain modified set points $r_1^*$, $r_2^*$. In one implementation, the decoupling adder 930A includes an input to receive the first feedback signal $y_1$, an input coupled to an output of the primary decoupling multiplier $T_{11}$, an input coupled to an output of the interaction decoupling multiplier $T_{12}$, and an output coupled to an input of the feedback loop controller 740A. Similarly, the decoupling adder 930B includes an input to receive the second feedback signal $y_2$, an input coupled to an output of the primary decoupling multiplier $T_{22}$, an input coupled to an output of the interaction decoupling multiplier $T_{21}$, and an output coupled to another input of the feedback loop controller 740B. In this configuration, the decoupling adder 930A adds the feedback signal $y_1$, the first primary multiplied error signal $sp_1$, and the first interaction multiplied error signal $si_1$ to obtain the first modified set point $r_1^*$. Similarly, the decoupling adder 930B adds the feedback signal $y_2$, the second primary multiplied error signal $sp_2$, and the second interaction multiplied error signal $si_2$ to obtain the second modified set point $r_2^*$.

In one aspect, the coefficients $tc_{11}$, $tc_{12}$, $tc_{21}$, $tc_{22}$ are determined such that interaction between two feedback loops can be predicted and the modified set points can be generated when the target set points $r_1$, $r_2$ and the feedback signals $y_1$, $y_2$ are applied to the decoupler 730. The modified set points applied to the feedback loop controllers 740A, 740B allow the effect of the target set point $r_1$ on the second feedback loop 710B, and the effect of the target set point $r_2$ on the first feedback loop 710A to be reduced. In one approach, the coefficients $tc_{11}$, $tc_{12}$, $tc_{21}$, $tc_{22}$ are determined to satisfy the following equation:

$$y = GCTe = \text{diag}(G)C(s)e = \text{diag}(G)C'(s)\left(\frac{1}{s}\right)e \qquad \text{Eq. (3)}$$

where $$y = \begin{bmatrix} y_1 \\ y_2 \end{bmatrix}, e = \begin{bmatrix} e_1 \\ e_2 \end{bmatrix}, G = \begin{bmatrix} gc_{11} & gc_{12} \\ gc_{21} & gc_{22} \end{bmatrix},$$

$$C'(s) = \begin{bmatrix} C'_1(s) & 0 \\ 0 & C'_2(s) \end{bmatrix}, T = \begin{bmatrix} tc_{11} & tc_{12} \\ tc_{21} & tc_{22} \end{bmatrix},$$

$C_1'(s)$ is a transfer function of the PD controller $C_1'$ of FIG. 8, and $C_2'(s)$ is a transfer function of the PD controller $C_1'$ of FIG. 8. That is, the coefficients $tc_{11}$, $tc_{12}$, $tc_{21}$, $tc_{22}$ are selected such that (i) the feedback signal $y_1$ depends on the decoupling error signal $e_1$ but not the decoupling error signal $e_2$, and (ii) the feedback signal $y_2$ depends on the decoupling error signal $e_2$ but not the decoupling error signal $e_1$. In particular, the coefficients $tc_{11}$, $tc_{12}$, $tc_{21}$, $tc_{22}$ may be selected to satisfy the following equation:

$GC'(s)T = \text{diag}(G)C'(s)$, or $$T = C'(s)^{-1}G^{-1}\text{diag}(G)C'(s) \qquad \text{Eq. (4).}$$

Although the HVAC system 600 in FIG. 6 and the climate control system 700 in FIG. 7 are shown to control climates in two areas through two feedback loops, in other embodiments, additional areas can be controlled by modifying target set points through one or more decouplers and applying the modified set points to feedback loops, according to the disclosed principle herein.

In some embodiments, the climate control system 700 can dynamically adapt to a change in a configuration of a space. For example, the climate control system 700 can determine a change in interaction between two feedback loops (e.g., interaction actuator multipliers $G_{12}$, $G_{21}$ of FIG. 5B). A change in interaction between two feedback loops may be performed by open loop tests, closed loop tests or a combination of them. The climate control system 700 may determine a change in the interaction between the two feedback loops when automatically detecting a change in target set points, when automatically detecting a change in configuration of the space, when manually requested by a user, or periodically. Responsive to detecting the change in the interaction between the two feedback loops, the climate control system 700 can adjust the coefficients $tc_{11}$, $tc_{12}$, $tc_{21}$, $tc_{22}$, for example, according to Eq. (4) above.

In some embodiments, the configuration of a space is selected from a set of configurations, and the coefficients $tc_{11}$, $tc_{12}$, $tc_{21}$, $tc_{22}$ are determined according to the selected configuration. For example, a wall separating two rooms 410A, 410B may be selectively configured according to options including "fully opened," "half way opened," and "fully closed." Prior to operation or in between operations, interaction between feedback loops may be determined for each configuration, and a corresponding set of coefficients $tc_{11}$, $tc_{12}$, $tc_{21}$, $tc_{22}$ may be predetermined accordingly. Additionally, a corresponding set of coefficients $tc_{11}$, $tc_{12}$, $tc_{21}$, $tc_{22}$ may be stored by a memory for each configuration. During operation, a corresponding set of coefficients $tc_{11}$, $tc_{12}$, $tc_{21}$, $tc_{22}$ may be retrieved according to the selected configuration of the wall (or a configuration of the space) to implement the decoupler as disclosed herein.

Figure 10:
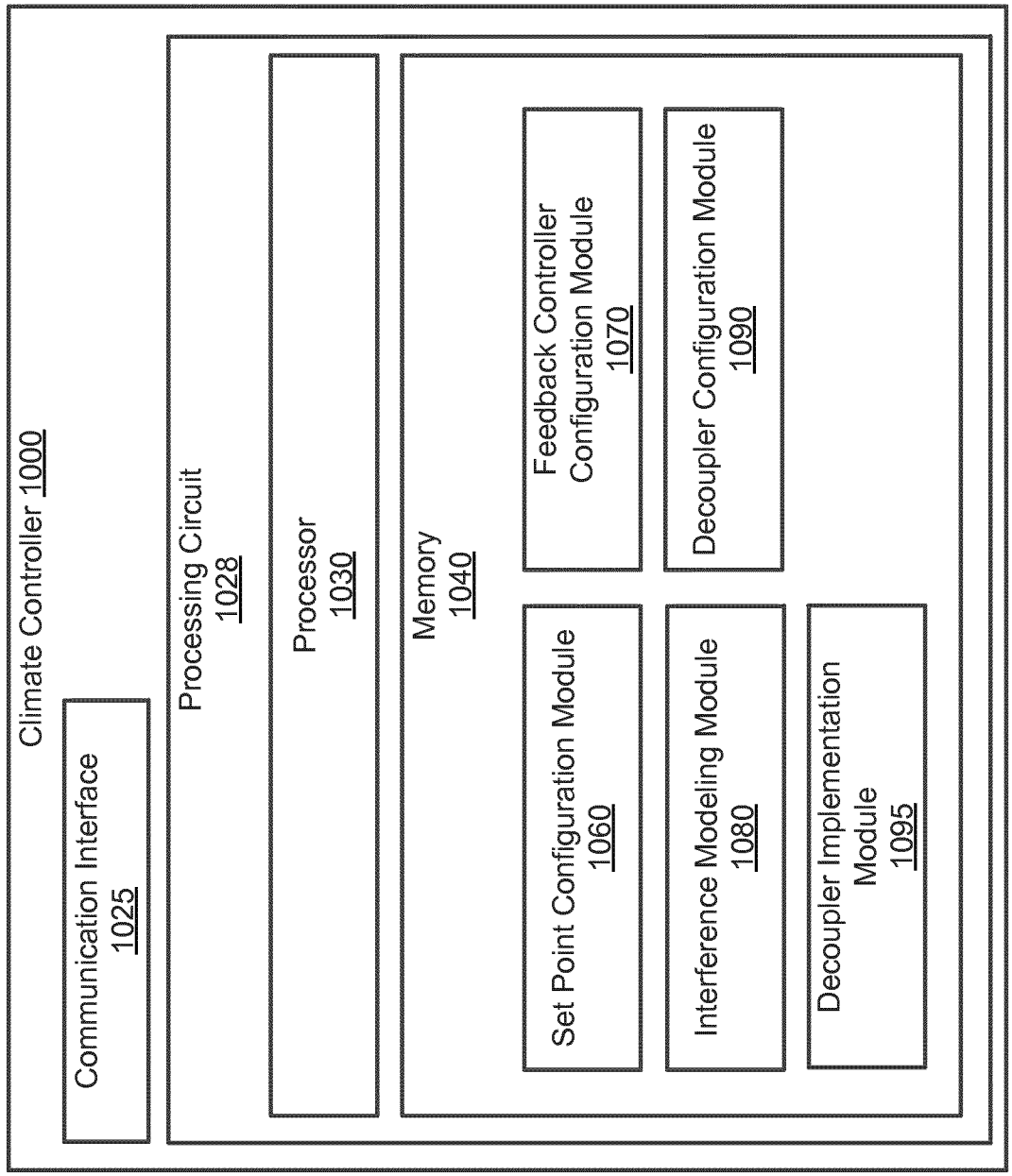
FIG. 10 is a block diagram of a climate controller to implement a decoupler for improving control of two interacting feedback loops, according to some embodiments.

FIG. 10 is a block diagram of a climate controller 1000 to implement a decoupler (e.g., decoupler 630 of FIG. 6) for improving control of interacting feedback loops, according to one or more embodiments. The climate controller 1000 may be the AHU controller 330 of FIG. 3, or a combination of the BMS controller 366 and the AHU controller 330 of FIG. 3. In one configuration, the climate controller 1000 includes a communication interface 1025, and a processing circuit 1028. These components operate together to implement a decoupler that modifies the target set points to obtain modified set points, and applies the modified set points to interacting feedback loops for improved control. In some embodiments, the climate controller 1000 includes additional, fewer, or different components than shown in FIG. 10.

The communication interface 1025 facilitates communication of the climate controller 1000 with other components (e.g., dampers 420A, 420B, air handling unit 405 or thermostats 425A, 425B of FIG. 6). The communication interface 1025 can be or include wired or wireless communications interfaces (e.g., jacks, antennas, transmitters, receivers, transceivers, wire terminals, etc.). In various embodiments, communications via the communication interface 1025 can be direct (e.g., local wired or wireless communications) or via a communications network (e.g., a WAN, the Internet, a cellular network, etc.). For example, the communication interface 1025 can include an Ethernet/USB/RS232/RS485 card and port for sending and receiving data through a network. In another example, the communication interface 1025 can include a Wi-Fi transceiver for communicating via a wireless communications network. In another example, the communication interface 1025 can include cellular or mobile phone communication transceivers.

The processing circuit 1028 is a hardware circuit that facilitates implementation of the decoupler 730 of FIG. 7. In one embodiment, the processing circuit 1028 includes a processor 1030, and memory 1040 storing instructions (or program code) executable by the processor 1030. In one embodiment, the instructions executed by the processor 1030 form software modules including a set point configuration module 1060, a feedback controller configuration module 1070, an interference modeling module 1080, a decoupler configuration module 1090, and a decoupler implementation module 1095. In other embodiments, the processor 1030, and the memory 1040 may be omitted, and these modules may be implemented as hardware modules by a reconfigurable circuit (e.g., field programmable gate array (FPGA)), an application specific integrated circuit (ASIC), or any circuitries, or a combination of software modules and hardware modules.

The set point configuration module 1060 is a component that obtains target set points. The set point configuration module 1060 may receive target set points of different rooms through the communication interface 1025. The set point configuration module 1060 may store the received target set points, and provide the target set points to the feedback controller configuration module 1070, the interference modeling module 1080, the decoupler configuration module 1090, and the decoupler implementation module 1095.

The feedback controller configuration module 1070 is a component that obtains parameters for configuring feedback loop controllers. A feedback loop controller may be a feedback loop controller 740 of FIG. 7 that generates a control signal for controlling a climate actuator (e.g., heater, chiller, valve, etc.) according to the parameters for configuring the feedback loop controllers. Examples of the parameters include transfer functions, gain coefficients of components in the feedback loop controller, etc. In one approach, the feedback controller configuration module 1070 obtains parameters (e.g., transfer function or gain coefficients such as primary actuator coefficients $gc_{11}$, $gc_{22}$) of climate actuators (e.g., primary actuator multipliers $G_{11}$ and $G_{22}$) through open loop test measurements. In addition, the feedback controller configuration module 1070 obtains the parameters for configuring the feedback loop controllers through a user input, or through an automated process to drive the climate actuators. In one aspect, the feedback controller configuration module 1070 obtains a design of a PI controller, and converts the PI controller into a PD controller to obtain the parameters according to Eq. (2).

The interference modeling module 1080 is a component that generates modeling of an interaction between feedback loops. In one approach, the interference modeling module 1080 generates model data corresponding to a first schematic representation of independent feedback loops (e.g., independent feedback loops of FIG. 5A), and generates additional model data corresponding to a second schematic representation of interacting feedback loops (e.g., interacting feedback loops of FIG. 5B) by adding interaction components to the first schematic representation. Moreover, the interference modeling module 1080 determines parameters (e.g., transfer function or gain coefficients such as interaction actuator coefficients $gc_{12}$, $gc_{21}$) of the interaction components (e.g., interaction actuator multipliers $G_{12}$ and $G_{21}$). The interference modeling module 1080 may determine the parameters through opened loop tests, closed loop tests, or a combination of them. The interference modeling module 1080 may determine the parameters when automatically detecting a change in target set points, when manually requested by a user, periodically, or any combination of them.

The decoupler configuration module 1090 determines parameters for configuring a decoupler (e.g., decoupler of FIG. 6) that improves control of interacting feedback loops in different areas. In one approach, the decoupler configuration module 1090 determines parameters (e.g., gain coefficients or transfer functions) for configuring the decoupler based on parameters for configuring feedback loop controllers and the interaction components of the schematic representation of the interacting feedback loops. In particular, the decoupler configuration module 1090 may determine parameters of the decoupler according to Eq. (4) such that, for each area, climate depends on a corresponding target set point, but not other target set points.

The decoupler implementation module 1095 is a component that implements the decoupler (e.g., decoupler 630 of FIG. 6) according to the parameters determined by the decoupler configuration module 1090. The decoupler implementation module 1095 may generate a model data (e.g., netlist or register transfer level (RTL) code) indicating schematic representation of the decoupler and parameters for configuring the decoupler. Based on the model data, the decoupler implementation module 1095 may implement the decoupler on a reconfigurable hardware circuit. For example, the decoupler implementation module 1095 generates decoupling error detectors 905, integrators 910A, 910B, multipliers $T_{11}$, $T_{12}$, $T_{21}$, $T_{22}$, and decoupling adders 930 as shown in FIG. 9, according to the parameters for configuring the decoupler. Alternatively, the decoupler implementation module 1095 implements the decoupler on a software module to perform functionalities of the decoupler described herein.

Figure 11:
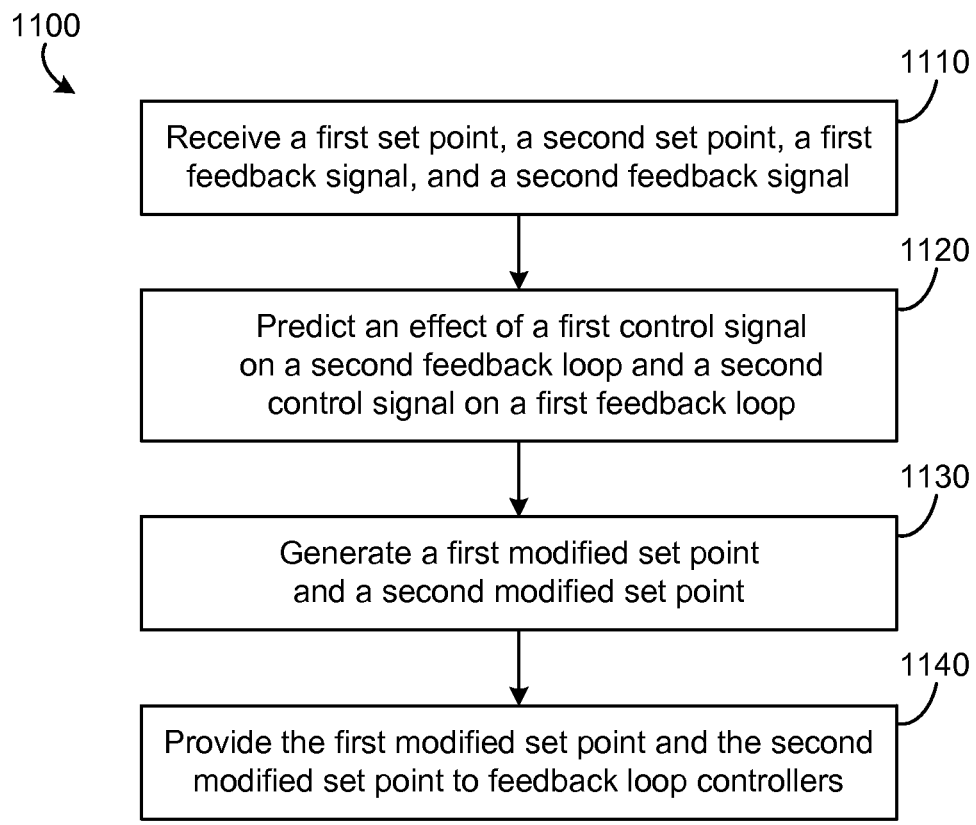
FIG. 11 is a flow chart illustrating a process of improving independent controls of interacting feedback loops, according to some embodiments.

FIG. 11 is a flow chart illustrating a process 1100 of improving independent controls of interacting feedback loops, according to some embodiments. The process 1100 may be performed by a decoupler 730 of FIG. 7. In some embodiments, the process 1100 may be performed by other entities. In some embodiments, the process 1100 may include additional, fewer, or different steps than shown in FIG. 11.

The decoupler 730 receives a first set point, a second set point, a first feedback signal, and a second feedback signal (step 1110). The first set point may be a signal or data indicating a target climate (e.g., temperature, pressure, humidity, etc.) of a first area of a space, and the second set point may be a signal or data indicating a target climate of a second area of the space. The first feedback signal may be a signal or data indicating a sensed climate of the first area of the space and the second feedback signal may be a signal or data indicating a sensed climate of the second area of the space.

The decoupler 730 predicts an effect of a first control signal on a second feedback loop and an effect of a second control signal on a first feedback loop (step 1120), and generates a first modified set point and a second modified set point based on the predicted effects (step 1130). In one aspect, the decoupler 730 predicts the effect of the first control signal on the second feedback loop and the effect of the second control signal on the first feedback loop, and generates pre-compensation components to reduce the predicted effects by applying the target set points and the feedback signals to a cross-over network of the decoupler 730. Parameters of the cross-over network may be selected based on a model of interaction between the first feedback loop and the second feedback loop, as described above with respect to FIG. 9 and Eq. (4).

The decoupler 730 provides the first modified set point to a first feedback loop controller to generate the first control signal and the second modified set point to the second feedback loop controller to generate the second control signal (step 1140). The first feedback loop controller and the second feedback loop controller operating according to the first modified set point and the second modified set point may reduce the predicted effect of the first control signal on the second feedback loop and the predicted effect of the second control signal on the first feedback loop.

Advantageously, generating modified set points by the decoupler and operating feedback loops according to the modified set points allow a climate of each area to be independently controlled by a respective target set point and irrespective of other target set points. Moreover, implementing the decoupler as disclosed herein allows the decoupler to be implemented at the front end, without intercepting connections or signals between feedback loop controllers and climate actuators.

Figure 12:
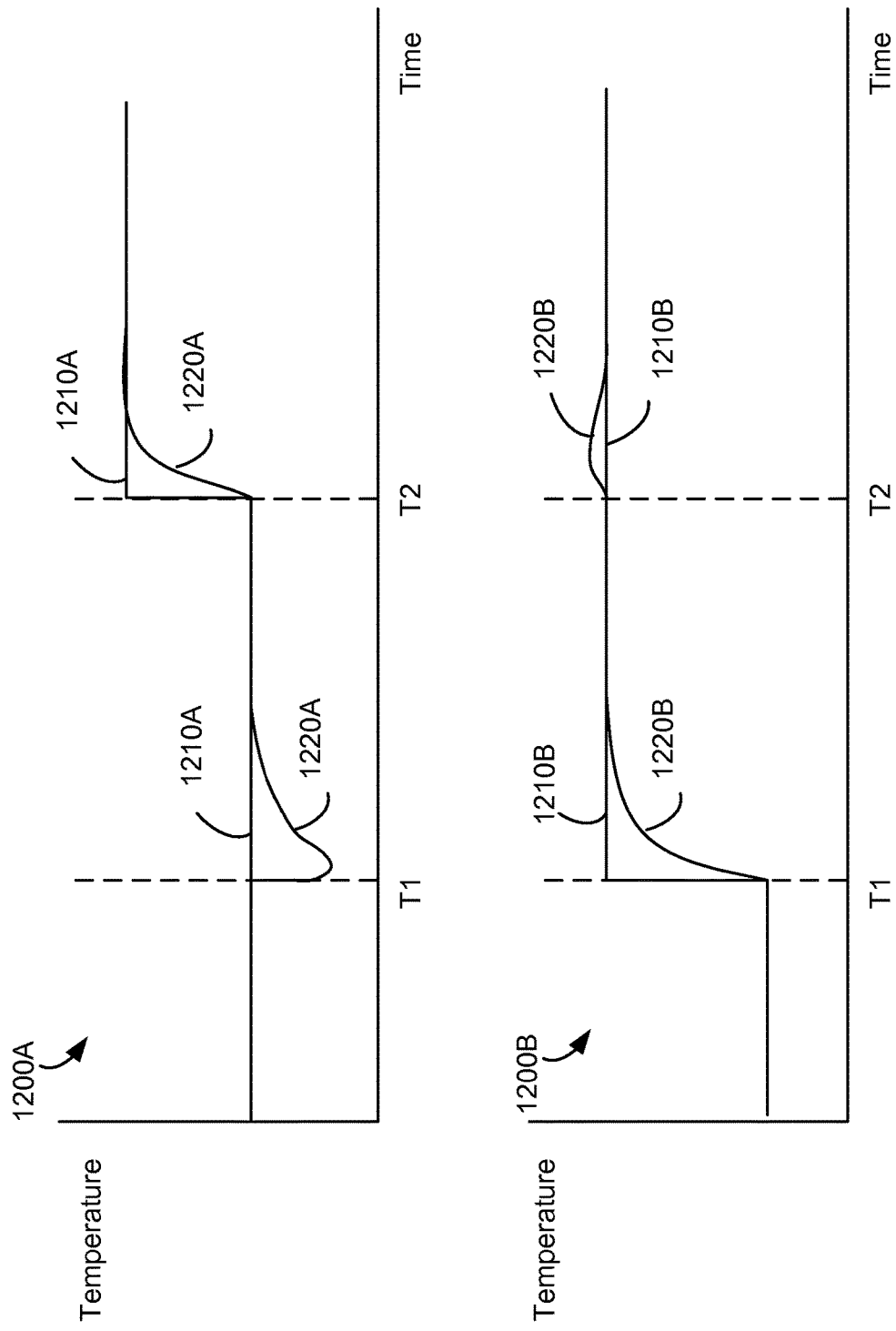
FIG. 12 is a graph illustrating a closed response of the climate control system of FIG. 5B, according to some embodiments.

Referring now to FIG. 12, a pair of graphs 1200A and 1200B illustrating an example closed loop response of the climate control system of FIG. 5B are shown, according to some embodiments. Graph 1200A indicates a target temperature 1210A of a first room and a measured temperature 1220A of the first room. Graph 1200B indicates a target temperature 1210B of a second room and a measured temperature 1220B of the second room. Because of two interacting feedback loops, when the target temperature 1210B of the second room changes at T1, temperature of the first room is affected as indicated by the measured temperature 1220A at T1. Similarly, when the target temperature 1210A of the first room changes at T2, temperature of the second room is affected as indicated by the measured temperature 1220B at T2.

Figure 13:
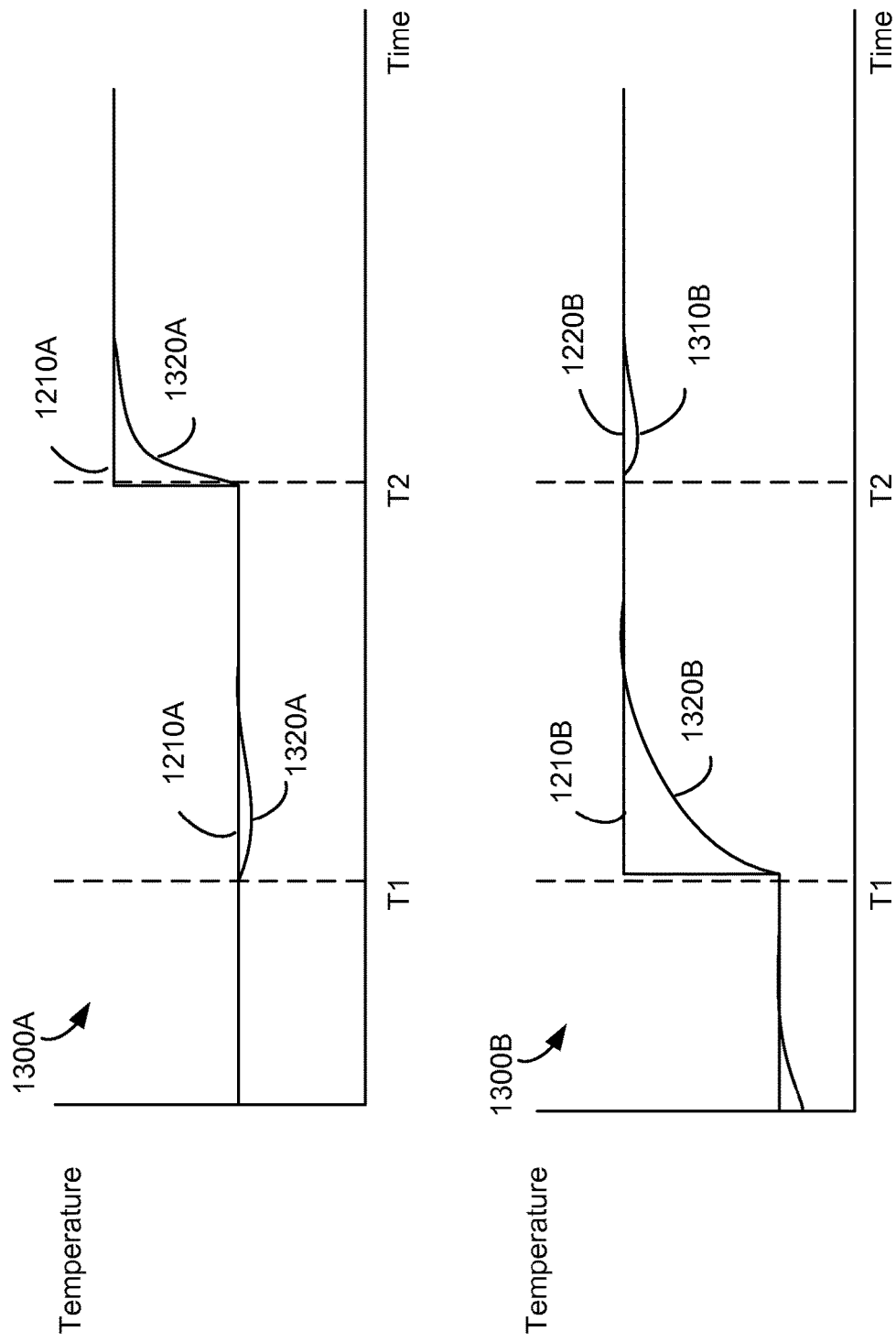
FIG. 13 is a graph illustrating a closed loop response of the climate control system of FIG. 7 including a decoupler as disclosed herein, according to some embodiments.

Referring now to FIG. 13, a pair of graphs 1300A and 1300B illustrating an example closed loop response of the climate control system of FIG. 7 including a decoupler as disclosed herein, according to some embodiments. Graph 1300A indicates a target temperature 1210A of the first room and a measured temperature 1320A of the first room. Graph 1300B indicates a target temperature 1210B of the second room and a measured temperature 1320B of the second room. Despite of the interacting feedback loops, an effect of the change in the target temperature 1210B of the second room on the measured temperature 1320A of the first room at T1 is reduced by employing the disclosed decoupler, compared to when the decoupler is not implemented as shown in FIG. 12. Similarly, an effect of the change in the target temperature 1210A of the first room on the measured temperature 1320B of the second room at T2 is reduced by employing the disclosed decoupler, compared to when the decoupler is not implemented as shown in FIG. 12.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

Although the configurations as disclosed are in the context of controlling climates of different areas of a space, the principles disclosed herein can apply to any system including interacting feedback loops. For example, the system may include a vapor compression cycle for controlling climate of a space, and a decoupler as disclosed herein to reduce interaction between two interacting feedback loops within the single vapor compression cycle.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An electrical decoupler comprising:
a first integrator configured to generate a first integrated decoupling error signal based on a first set point and a first feedback signal, the first feedback signal from a first control loop;
a second integrator configured to generate a second integrated decoupling error signal based on a second set point and a second feedback signal, the second feedback signal from a second control loop; and
a cross-over network coupled to the first integrator and the second integrator and positioned (i) between the first integrator and a first controller of the first control loop and (ii) between the second integrator and a second controller of the second control loop, the cross-over network configured to:
predict (i) a first effect of a first control signal from the first controller on the second control loop, and (ii) a second effect of a second control signal from the second controller on the first control loop,
generate a first set of multiplied error signals and a second set of multiplied error signals, each set based on the first integrated decoupling error signal and the second integrated decoupling error signal, and
generate a first modified set point by combining the first set of multiplied error signals with the first feedback signal and generate a second modified set point by combining the second set of multiplied error signals with the second feedback signal to reduce the first predicted effect and the second predicted effect.

2. The decoupler of claim 1, wherein the cross-over network is configured to provide (i) the first modified set point to the first controller and (ii) the second modified set point to the second controller, the first controller to control the first control loop according to the first modified set point, the second controller to control the second control loop according to the second modified set point.

3. The decoupler of claim 1, wherein the first set point indicates a target temperature of a first area of a space, and the second set point indicates a target temperature of a second area of the space.

4. The decoupler of claim 3, wherein the first feedback signal indicates a measured temperature of the first area, and the second feedback signal indicates a measured temperature of the second area.

5. The decoupler of claim 1, further comprising:
a first decoupling error detector coupled to the first integrator, the first decoupling error detector configured to generate a first decoupling error signal by obtaining a difference between the first set point and the first feedback signal; and
a second decoupling error detector coupled to the second integrator, the second decoupling error detector configured to generate a second decoupling error signal by obtaining a difference between the second set point and the second feedback signal.

6. The decoupler of claim 5,
wherein the first integrator is configured to integrate the first decoupling error signal for a time period to generate the first integrated decoupling error signal, and
wherein the second integrator is configured to integrate the second decoupling error signal for the time period to generate the second integrated decoupling error signal.

7. The decoupler of claim 1, wherein the cross-over network comprises:
a first primary decoupling multiplier coupled to the first integrator, the first primary decoupling multiplier configured to generate a first primary multiplied error signal by multiplying the first integrated decoupling error signal by a first primary decoupling coefficient, wherein the first primary multiplied error signal is one of the first set of multiplied error signals,
a first interaction decoupling multiplier coupled to the second integrator, the first interaction decoupling multiplier configured to generate a first interaction multiplied error signal by multiplying the second integrated decoupling error signal by a first interaction decoupling coefficient, wherein the first interaction multiplied error signal is another of the first set of multiplied error signals,
a second primary decoupling multiplier coupled to the second integrator, the second primary decoupling multiplier configured to generate a second primary multiplied error signal by multiplying the second integrated decoupling error signal by a second primary decoupling coefficient, wherein the second primary multiplied error signal is one of the second set of multiplied error signals, and
a second interaction decoupling multiplier coupled to the first integrator, the second interaction decoupling multiplier configured to generate a second interaction multiplied error signal by multiplying the first integrated decoupling error signal by a second interaction decoupling coefficient, wherein the second interaction multiplied error signal is another of the second set of multiplied error signals.

8. The decoupler of claim 7, further comprising:
a first decoupling adder coupled to the first primary decoupling multiplier, the first interaction decoupling multiplier, and the first controller, the first decoupling adder configured to generate the first modified set point by adding the first primary multiplied error signal, the first interaction multiplied error signal, and the first feedback signal; and
a second decoupling adder coupled to the second primary decoupling multiplier, the second interaction decoupling multiplier, and the second controller, the second decoupling adder configured to generate the second modified set point by adding the second primary multiplied error signal, the second interaction multiplied error signal, and the second feedback signal.

9. The decoupler of claim 1,
wherein the first controller comprises:
a first control error detector coupled to the decoupler, the first control error detector configured to generate a first control error signal corresponding to a difference between the first modified set point and the first feedback signal, and
a first proportional derivative controller coupled to the first control error detector, the first proportional derivative controller configured to generate the first control signal as a function of the first control error signal, and
wherein the second controller comprises:
a second control error detector coupled to the decoupler, the second control error detector configured to generate a second control error signal corresponding to a difference between the second modified set point and the second feedback signal, and
a second proportional derivative controller coupled to the second control error detector, the second proportional derivative controller configured to generate the second control signal as a function of the second control error signal.

10. The decoupler of claim 1, wherein the first feedback signal is generated as a function of the first control signal and the second control signal, and wherein the second feedback signal is generated as a function of the first control signal and the second control signal.

11. The decoupler of claim 1, wherein each of the first controller and the second controller is a proportional controller, a derivative controller, or a proportional derivative controller.

12. A method of electrically controlling a first control loop and a second control loop that interacts with the first control loop, the method comprising:
receiving, by a decoupler comprising a first integrator and a second integrator, a first set point, a second set point, a first feedback signal, and a second feedback signal;
generating, by the first integrator, a first integrated decoupling error signal by integrating a first decoupling error signal, the first decoupling error signal based on the first set point and the first feedback signal;
generating, by the second integrator, a second integrated decoupling error signal by integrating a second decoupling error signal, the second decoupling error signal based on the second set point and the second feedback signal;
providing the first integrated decoupling error signal and the second integrated decoupling error signal to a cross-over network positioned (i) between the first integrator and a first controller of the first control loop and (ii) between the second integrator and a second controller of the second control loop;
predicting a first effect of a first control signal on the second control loop;
predicting a second effect of a second control signal on the first control loop;
generating, by the cross-over network, a first set of multiplied error signals and a second set of multiplied error signals, each set based on the first integrated decoupling error signal and the second integrated decoupling error signal; and
generating, by the cross-over network, (i) a first modified set point by combining the first set of multiplied error signals with the first feedback signal and (ii) a second modified set point by combining the second set of multiplied error signals with the second feedback signal to reduce the first predicted effect and the second predicted effect, the first control loop controlled according to the first modified set point, the second control loop controlled according to the second modified set point.

13. The method of claim 12, further comprising:
detecting a change in a level of interaction between the first control loop and the second control loop; and
adapting, by the decoupler, to the change in the level of interaction between the first control loop and the second control loop.

14. The method of claim 12,
wherein the first set point indicates a target temperature of a first area of a space, and the second set point indicates another target temperature of a second area of the space, and
wherein the first feedback signal indicates a measured temperature of the first area, and the second feedback signal indicates a measured temperature of the second area.

15. The method of claim 12, wherein the decoupler generates the first modified set point and the second modified set point by:
generating the first decoupling error signal corresponding to a difference between the first set point and the first feedback signal; and
generating the second decoupling error signal corresponding to a difference between the second set point and the second feedback signal.

16. The method of claim 15, wherein the decoupler further generates the first modified set point and the second modified set point by:
generating a first primary multiplied error signal by multiplying the first integrated decoupling error signal by a first primary decoupling coefficient, wherein the first primary multiplied error signal is one of the first set of multiplied error signals;
generating a first interaction multiplied error signal by multiplying the second integrated decoupling error signal by a first interaction decoupling coefficient, wherein the first interaction multiplied error signal is another of the first set of multiplied error signals;

generating a second primary multiplied error signal by multiplying the second integrated decoupling error signal by a second primary decoupling coefficient, wherein the second primary multiplied error signal is one of the second set of multiplied error signals; and generating a second interaction multiplied error signal by multiplying the first integrated decoupling error signal by a second interaction decoupling coefficient, wherein the second interaction multiplied error signal is another of the second set of multiplied error signals.

17. The method of claim 16, wherein the decoupler further generates the first modified set point and the second modified set point by:

adding the first primary multiplied error signal, the first interaction multiplied error signal, and the first feedback signal to obtain the first modified set point; and adding the second primary multiplied error signal, the second interaction multiplied error signal, and the second feedback signal to obtain the second modified set point.

18. The method of claim 12, wherein each of the first controller and the second controller is a proportional controller, a derivative controller, or a proportional derivative controller.

19. A system for correcting interactions between a pair of heating, ventilation, and air conditioning (HVAC) controllers, comprising:

at least one sensor serving each of the pair of HVAC controllers; and a controller using original set points and feedback from the at least one sensor to serve as a decoupler, the controller comprising a processing circuit configured to send corrected set points to each of the pair of HVAC controllers, the processing circuit comprising:

two integrators that provide a first integrated decoupling error signal and a second integrated decoupling error signal based on the original set points and the feedback from the at least one sensor, and a decoupling matrix network that:

generates a first set of multiplied error signals and a second set of multiplied error signals, each set based on the first integrated decoupling error signal and the second integrated decoupling error signal; and generates a first modified setpoint of the corrected set points by combining the first set of multiplied error signals with a first feedback signal of the feedback from the at least one sensor and generates a second modified setpoint of the corrected setpoints by combining the second set of multiplied error signals with a second feedback signal of the feedback from the at least one sensor;

wherein the decoupling matrix network is positioned between the two integrators and the pair of HVAC controllers such that an integral control action is performed by the processing circuit at the two integrators before correcting the interactions at the decoupling matrix network and before sending the corrected set points to the pair of HVAC controllers.

20. The system of claim 19, wherein the each of the pair of HVAC controllers is a proportional controller, a derivative controller, or a proportional-derivative controller.

* * * * *